United States Patent [19]
Duzett et al.

[11] Patent Number: 5,638,516
[45] Date of Patent: Jun. 10, 1997

[54] PARALLEL PROCESSOR THAT ROUTES MESSAGES AROUND BLOCKED OR FAULTY NODES BY SELECTING AN OUTPUT PORT TO A SUBSEQUENT NODE FROM A PORT VECTOR AND TRANSMITTING A ROUTE READY SIGNAL BACK TO A PREVIOUS NODE

[75] Inventors: Robert C. Duzett, Hillsboro; Stanley P. Kenoyer, Forest Grove, both of Oreg.

[73] Assignee: nCUBE Corporation, Beaverton, Oreg.

[21] Appl. No.: 283,572

[22] Filed: Aug. 1, 1994

[51] Int. Cl.[6] ................................................. G06F 13/00
[52] U.S. Cl. .................. 395/200.15; 395/200.02; 395/200.12; 395/200.1; 395/800; 364/DIG. 1
[58] Field of Search ................................. 395/800, 200.1, 395/200.16, 200.15, 200.02, 200.12; 364/DIG. 1

[56] References Cited

U.S. PATENT DOCUMENTS

| | | | |
|---|---|---|---|
| 5,150,464 | 9/1992 | Sidhu et al. | 395/200.1 |
| 5,151,900 | 9/1992 | Snyder et al. | 370/94.3 |
| 5,367,636 | 11/1994 | Colley et al. | 395/200 |
| 5,388,213 | 2/1995 | Oppenheimer et al. | 395/200.16 |
| 5,390,298 | 2/1995 | Kurzmaul et al. | 395/200.16 |
| 5,471,589 | 11/1995 | Akkawi et al. | 395/800 |
| 5,471,623 | 11/1995 | Napolitano, Jr. | 395/200.03 |

OTHER PUBLICATIONS

Lionel M. Ni and Philip K. McKinley "A Survey of Wormhole Routing Techniques in Direct Networks" Feb. 1993 IEEE Computer pp. 62–75.

S. Konstantinidou and L. Snyder "The Chaos Router: A Practical Application of Randomization in Network Routing" Jul. 1990 Association for Computing Machinery (ACM) pp. 21–30.

John Y. Ngai and Charles L. Seitz "A Framework for Adaptive Routing in Multicomputer Networks" 1989 Association for Computing Machinery (ACM) pp. 6–14.

Patrick T. Gaughan and Sudhakar Yalamanchili "Adaptive routing Protocols for Hypercube Interconnection Networks" May 1993 IEEE Computer pp. 12–23.

Parallel Computing, vol. 20, No. 4, Apr.; 1994 Amsterdam NL, pp. 509–530.

XP 000433524 M. Schmidt–Voight "Efficient parallel communication with nCUBE 2S processor" see p. 511, line 3—p. 515; figures 2–5.

Computer Architecture News, vol. 19, No. 1, Mar. 1991 New York US, pp. 6–14.

XP 000201919 John Y. Ngai "A Framework for adaptive routing in multicomputer networks" see pp. 7–8.

5th Annual European Computer Conference, May 1991 Bologna, pp. 353–357.

J-L. Bechennec "An efficient hardwired router for a 3D mesh interrconnection network" see whole doc.

1992 IEEE BobDuzett and Ron Buck "An Overview of the nCUBE 3 Supercomputer".

*Primary Examiner*—Alyssa H. Bowler
*Assistant Examiner*—Dzung C. Nguyen
*Attorney, Agent, or Firm*—Owen L. Lamb

[57] ABSTRACT

A parallel processor network comprised of a plurality of nodes, each node including a processor containing a number of I/O ports, and a local memory. A communication path is established through a node by comparing a target node address in a first address packet with a processor ID of the node. If node address is equal to the target node address a receive channel is allocated to the input port and a route ready command is sent over an output port paired with the input port. If the node address is not equal to the target node address, then a first unallocated output port is selected from a port vector and the address packet is forwarded to a next node over the selected output port.

49 Claims, 11 Drawing Sheets

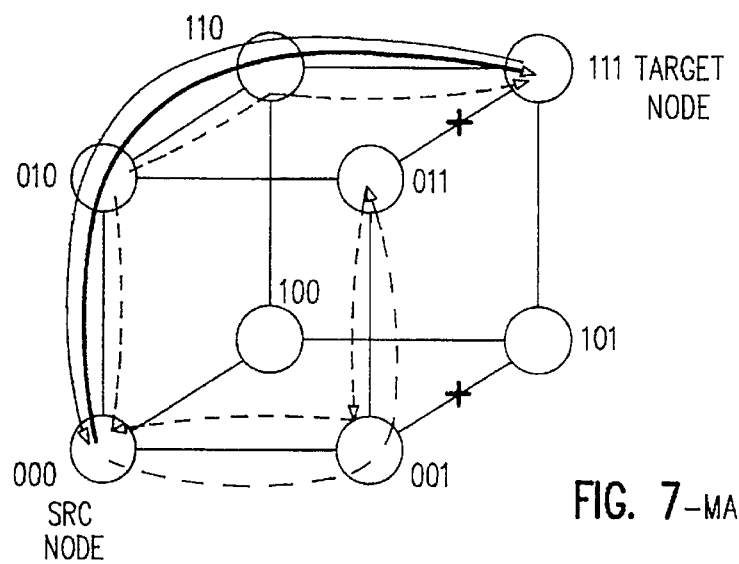
FIG. 7—MAZE ROUTING EXAMPLE
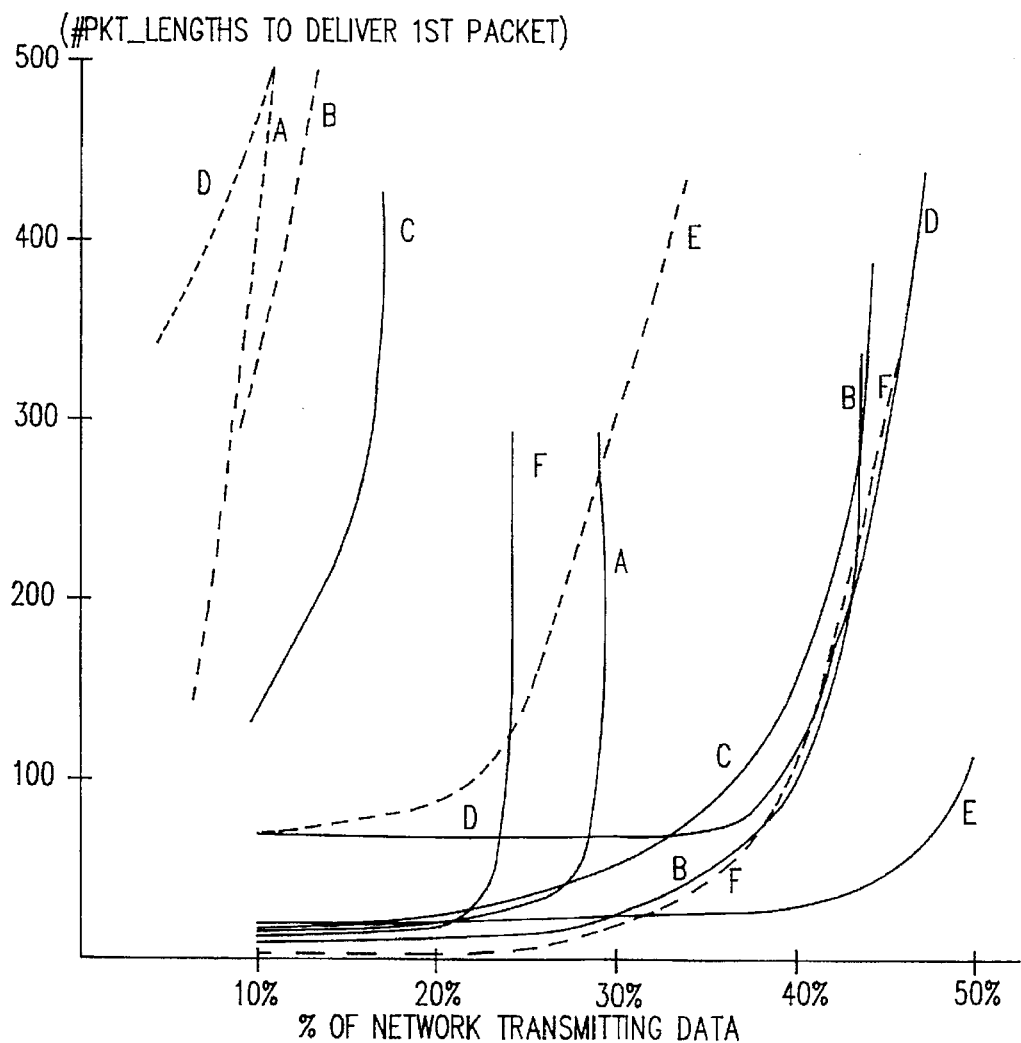
FIG. 8

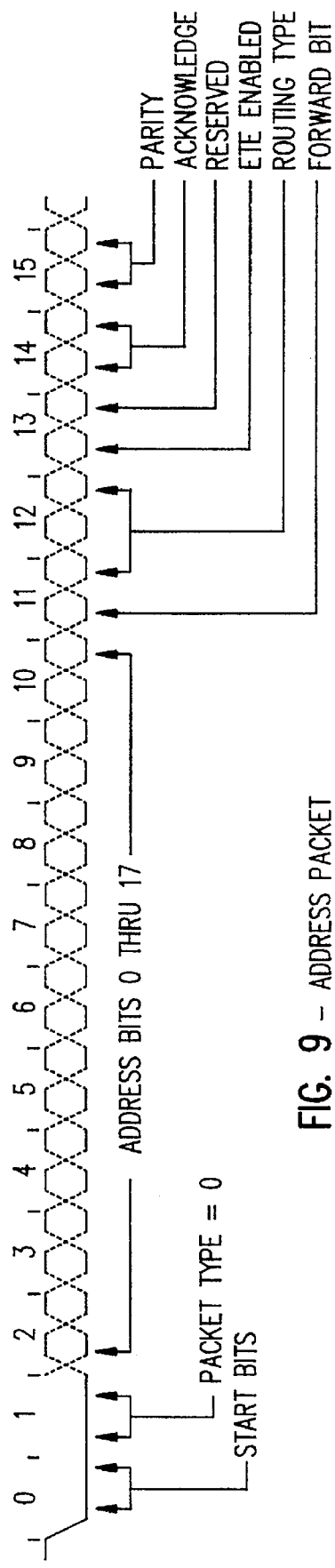
FIG. 9 – ADDRESS PACKET
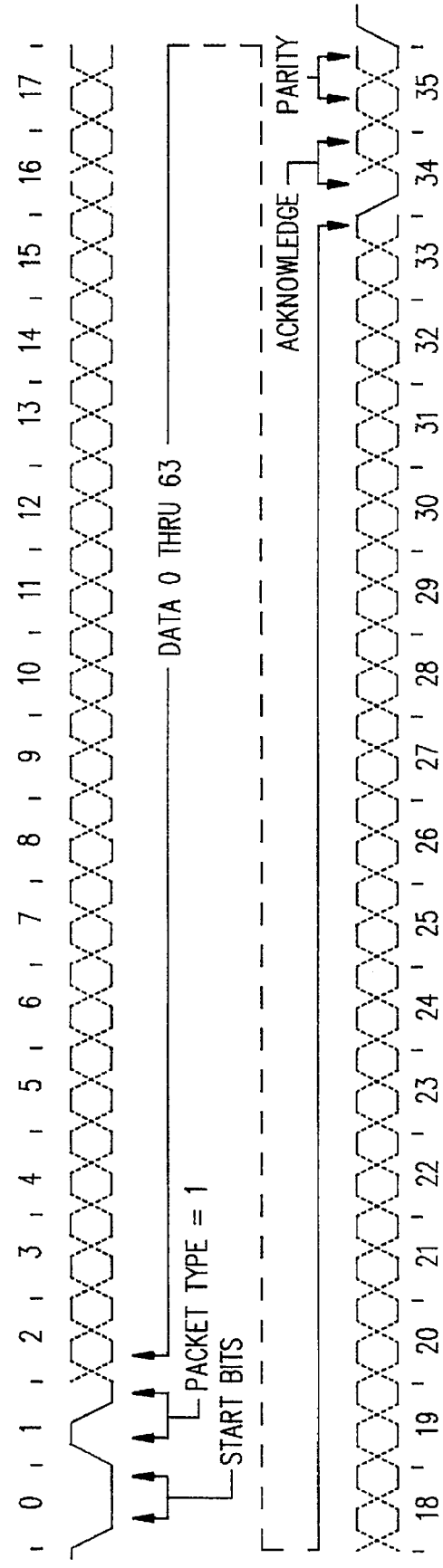
FIG. 10 – DATA PACKET

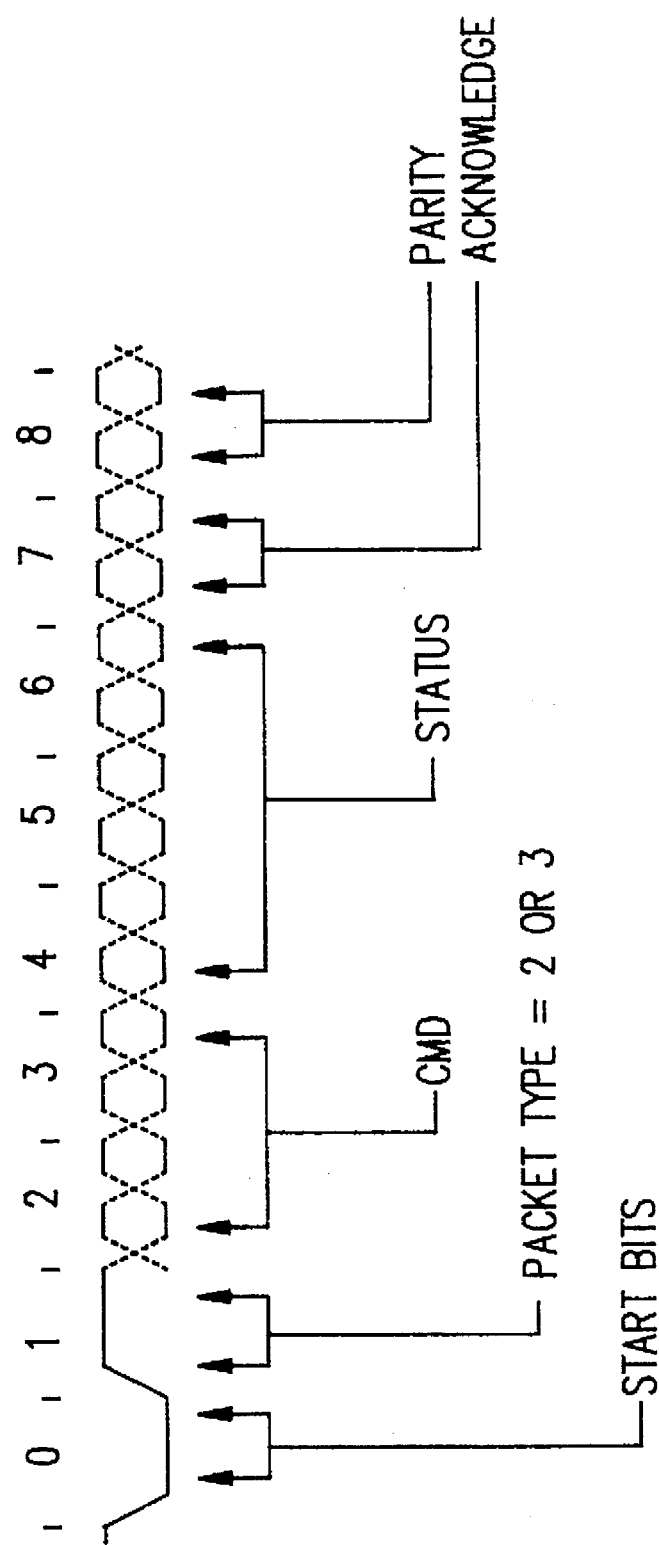
FIG. 11—COMMAND PACKET

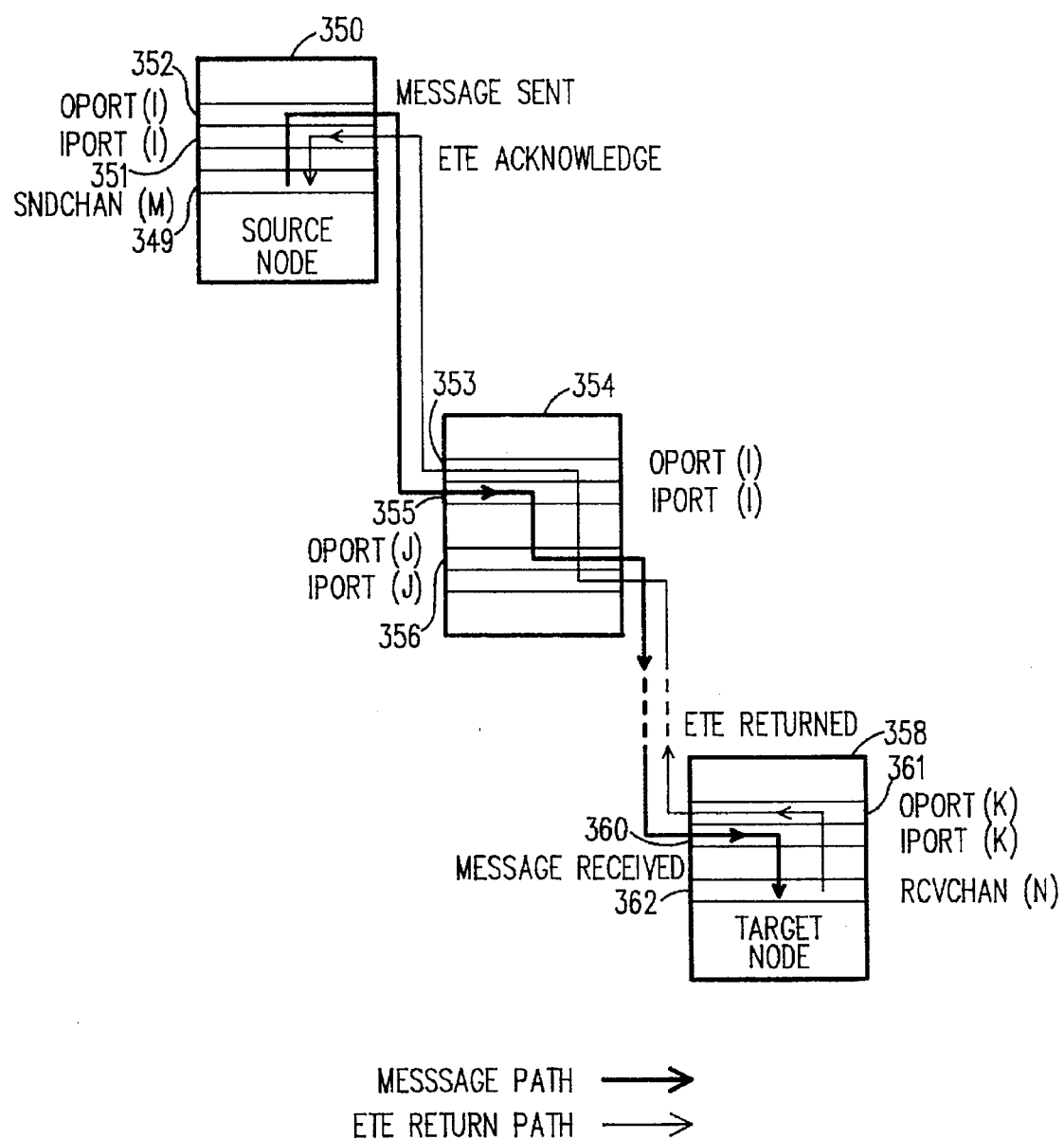
FIG. 14 END-TO-END ACKNOWLEDGE

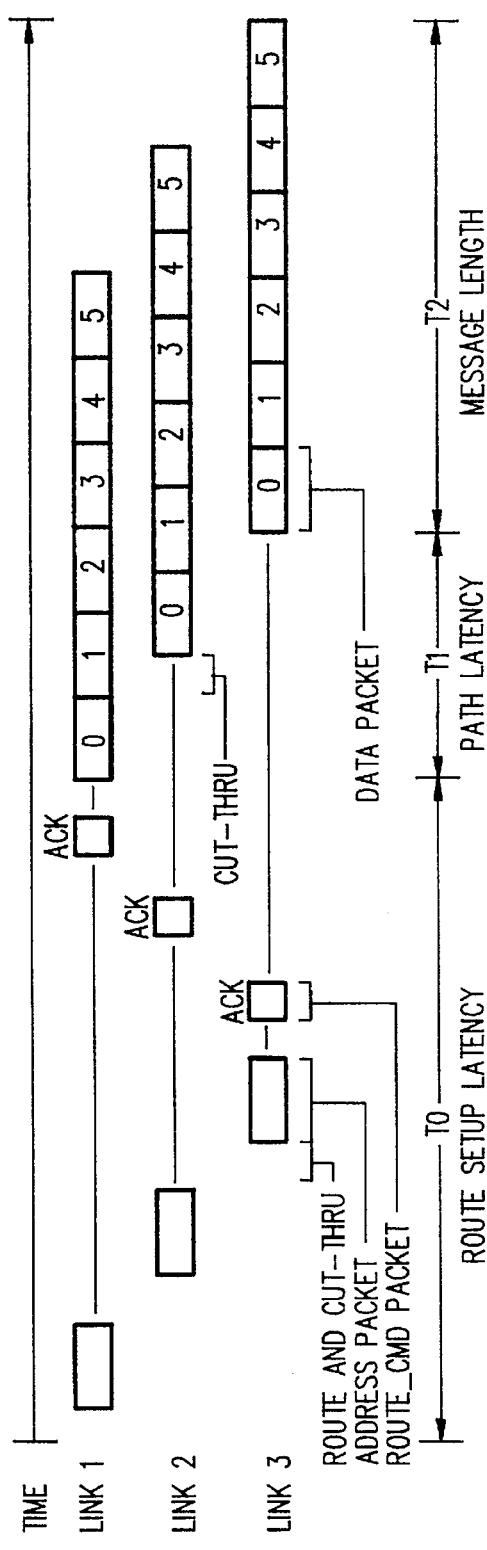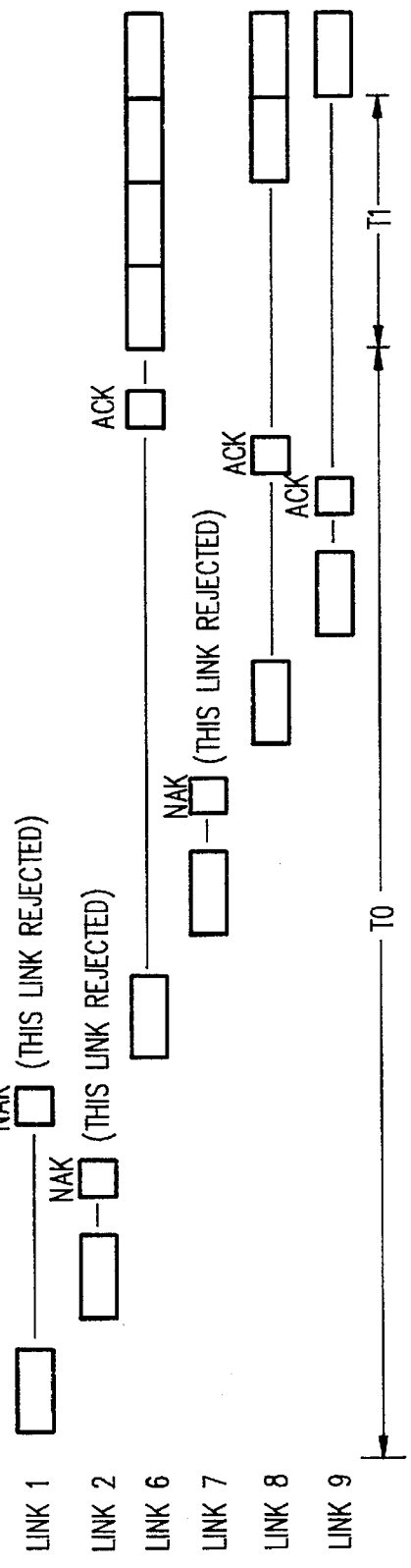
FIG. 15 – MAZE ROUTE TIMING – NO BLOCKED LINKS
FIG. 16 – MAZE ROUTE TIMING – BLOCKED LINKS AND BACKTRACKING

PARALLEL PROCESSOR THAT ROUTES MESSAGES AROUND BLOCKED OR FAULTY NODES BY SELECTING AN OUTPUT PORT TO A SUBSEQUENT NODE FROM A PORT VECTOR AND TRANSMITTING A ROUTE READY SIGNAL BACK TO A PREVIOUS NODE

CROSS-REFERENCE TO RELATED APPLICATION

U.S. Pat. No. 5,367,636 entitled "Network Communication Unit for use In a High Performance Computer System" of Stephen R. Colley, et al., granted on Nov. 22, 1994, assigned to nCUBE Corporation, the assignee of the present invention, and incorporated herein by reference.

BACKGROUND OF THE INVENTION

1. Field of the Invention

The invention relates to data-processing systems, and more particularly, to a communication mechanism for use in a high-performance, parallel-processing system.

2. Description of the Prior Art

U.S. Pat. No. 5,113,523 describes a parallel processor comprised of a plurality of processing nodes, each node including a processor and a memory. Each processor includes means for executing instructions, logic connected to the memory for interfacing the processor with the memory and an internode communication mechanism. The internode communication mechanism connects the nodes to form a first array of order n having a hypercube topology. A second array of order n having nodes connected together in a hypercube topology is interconnected with the first array to form an order n+1 array. The order n+1 array is made up of the first and second arrays of order n, such that a parallel processor system may be structured with any number of processors that is a power of two. A set of I/O processors are connected to the nodes of the arrays by means of I/O channels. The internode communication comprises a serial data channel driven by a clock that is common to all of the nodes.

The above-referenced U.S. Pat. No. 5,367,636, describes a fixed-routing communication system in which each of the processors in the network described in U.S. Pat. No. 5,113,523 is assigned a unique processor identification (ID). The processor IDs of two processors connected to each other through port number n, vary only in the nth bit. A plurality of input ports and a plurality of output ports are provided at each node. Control means at one of the input ports of the node receives address packets related to a current message from an output port of another of the nodes. A data bus connects the input and output ports of the node together such that a message received on any one input port is routed to any other output port. A compare logic compares a node address in a first address packet with the processor ID of the node to determine the bit position of the first difference between the node address in the first address packet and the processor ID of the node. The compare logic includes means for activating for transmission of the message packet placed on the data bus by the input port, the one of the plurality of output ports whose port number corresponds to the bit position of the first difference, starting at bit n+1, where n is the number of the port on which the message was received.

In the fixed routing scheme described in the above-referenced U.S. Pat. No. 5,367,636, a message from a given source to a given destination can take exactly one routing path, unless it is forwarded, cutting through intermediate nodes and blocking on busy channels until the path is established. The path taken is the dimension-order minimum-length path. While this scheme is deadlock-free, it will not reroute messages around blocked or faulty nodes.

It is desirable to provide a new communication system using reliable messaging mechanisms, whereby both the sender and receiver of a message can know quickly whether the message was delivered reliably, and the receiver may deliver status information back to the sender before an established path is broken.

It is also desirable that the communication system be able to route messages around blocked or faulty nodes and hot spots in a parallel processor, by implementing unique adaptive routing methods that make use of the reliable messaging mechanisms.

It is also desirable that the communication mechanism provide a more efficient utilization of the bandwidth of a hypercube communication network, by duplicating (folding) network links or otherwise unused communications ports, and by avoiding extended network blockages through the adaptive routing methods.

SUMMARY OF THE INVENTION

The reliable messaging mechanisms, whereby both the sender and receiver of a message can know quickly whether that the message was delivered reliably, and the receiver may deliver status information back to the sender before an established path is broken, is accomplished in accordance with an embodiment of the present invention by providing an end-to-end reporting network. When end-to-end is enabled and a message transmission along an established path from node A to node B is fully received at a receiver or "target" node B, hardware error status or a programmed receive code is sent, by the hardware, from node B back to node A along a parallel "back-track" path. Thus the communications architecture provides a transmission network and a corresponding back-track reporting network. These two networks are implemented as virtual networks that share the same physical communications network of internodal links. This has the advantage that a back-track network is added to an existing transmission network without a requirement for additional internodal communications links or signals.

In accordance with an aspect of the invention, end-to-end status packets are delivered via the back-track network to the send channel, at the sending node, that initiated the corresponding transmission. There is provided at each send channel an end-to-and status queue at which the programmed/central processing unit (CPU) is notified of and extracts the status.

The end-to-end hardware has the advantage of providing reliable messaging without additional message transmissions and the corresponding CPU and software overhead. Also, status is returned more reliably and much quicker by these dedicated end-to-end mechanisms than would be the case if a separate message had to be delivered from the receiver to the sender. Therefore, operating system resources dedicated to a given transmission can be released much sooner. In addition, these end-to-end mechanisms provide the back-track network upon which an adaptive routing protocol is built.

A communication system able to route messages around blocked or faulty nodes and hot spots in a parallel processor, is accomplished by implementing a unique maze adaptive routing mechanism that makes use of the back-track mechanism described above.

In a maze adaptive routing scheme for a transmission from node A to node B, all minimum-length paths between the two nodes are searched by a single-packet scout that attempts to find a free path.

One minimum path at a time is scouted, starting with the lowest-order uphill path and doing a depth-first, helical traversal of the minimum-path graph until a free path to the destination is found. If no free minimum-length path is found, other, non-minimum-length paths may be searched; or the central processing unit may be interrupted so that software can restart the search or implement some other policy.

The maze router also exhibits superior bandwidth usage and latency for most message mixes. This is attributed to its exhaustive yet sequential approach to route searching. The maze router eliminates the blockage of the fixed routing wormhole scheme, yet keeps route-search traffic to a minimum.

In accordance with an aspect of the invention, a node address packet, used for finding and establishing a route to a destination node, is provided with a destination-node address, plus other necessary control bits and parameters. The address packet, in conjunction with the back-track routing network, provides the means by which a suitable transmission path can be found adaptively by "scouting-out" various possible routes and reporting routing status back to the sending node as appropriate.

The invention has the advantage that the mechanism automatically routes around blocked or disabled nodes.

A more efficient utilization of the bandwidth of a hypercube communication network, by duplicating network links or otherwise unused communications ports, and by avoiding extended network blockages through the adaptive routing methods, is accomplished in accordance with the present invention by a network folding mechanism. For system configurations in which the hypercube is of a smaller dimension than the maximum supported by available port-links, the unused hypercube links can be used to duplicate the required internodal connections and thus provide additional routing paths and message data bandwidth. These "folded" connections are configured in the processor with a fold-enable mask register. The route-selection logic and node addressing logic is modified to allow transmission paths to be established through these folded/duplicated links.

The folding mechanisms provide the advantage of improved network bandwidth and message latency for systems configured as less than the maximum hypercube. This is accomplished in two ways. First, more links are available to paths within the folded cube and therefore more message data can be directed from one node to another in a given amount of time, thus increasing bandwidth. Second, more routing paths are available so that there is less chance of a blockage or a failure to route, and therefore a higher network bandwidth usage. Also, the average time to establish a route is shorter, thus reducing overall latency. These advantages apply to both fixed and adaptive routing methods, but are most efficiently exploited by the adaptive router.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein:

FIG. 7 is a maze routing example in an eight processor network dimension 3 hyper cube;

FIG. 8 is a graph of message latency versus percent of network transmitting data; for fixed and adaptive routing.

FIG. 9 is a diagram of an address packet;

FIG. 10 is a diagram of a data packet;

FIG. 11 is a diagram of a command packet;

FIG. 14 illustrates end-to-end acknowledge;

FIG. 15 is a maze-route timing diagram wherein there are no blocked links; and,

FIG. 16 is a maze-route timing diagram wherein there are blocked links.

DESCRIPTION OF THE PREFERRED EMBODIMENT

Signal Line Definitions

Figure 1:
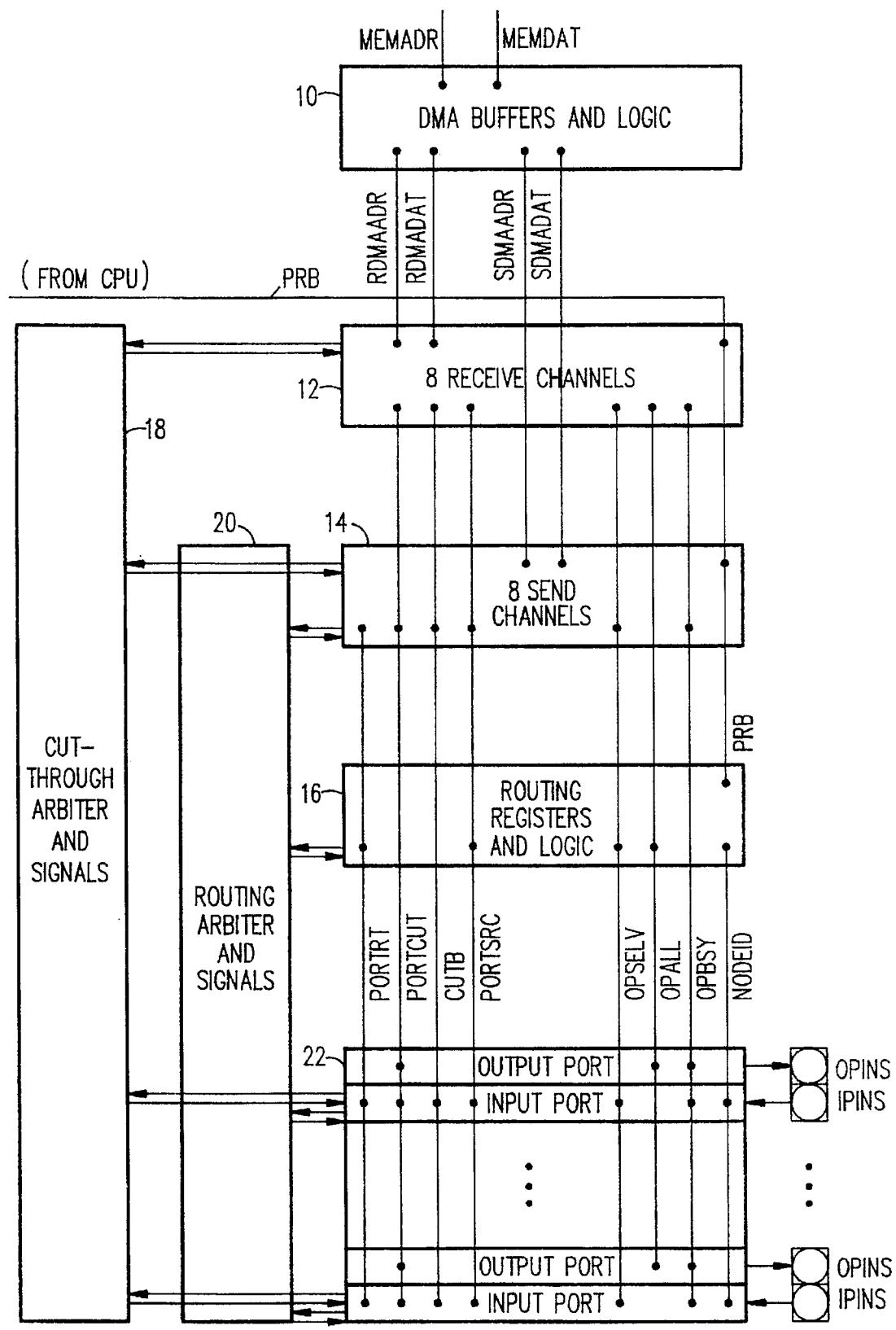
FIG. 1 is a detailed block diagram of a communications unit in which the present invention is embodied.

The following is a summary of signal line abbreviations used in FIG. 1 and their definitions:

CPU—Central Processing Unit.

CUTB—cut through bus by which commands, addresses and data are passed among ports and channels.

IPINS—input pins.

MEMADR—Memory address bus.

MEMDAT—Memory data bus.

NODEID—Node identification—a unique code number assigned to each node processor to distinguish a node from other nodes.

OPALL—output port allocation, one for each of 18 ports and 8 receive channels.

OPBSY—Output port busy—one line for each of 18 output ports and 8 receive channels to indicate that the corresponding output port or channel is busy.

OPINS—output pins.

OPSELV—output port and receive channel select vector; routing logic indicates the output port or channel selected.

PORTCUT—a vector indicating to which port, send channel or receive channel to cut through.

PORTSRC—a vector indicating which input port or send channel requests a route.

PORTRT—a vector of candidate ports from an agent requesting a route.

PRB—Processor Bus—a data bus from the central processing unit (CPU).

RDMAADR—receive DMA address.

RDMADAT—receive DMA data.

SDMAADR—send DMA address.

SDMADAT—send DMA data.

Command Definitions

ETE-ack—End-to-end acknowledge—when a transmission has completed, backtracking takes place in the reverse direction along the transmission route as ETE-ack logic retraces the path in order to deallocate all ports in that path and delivers status to the originating send channel.

BOT—Beginning of Transmission—A signal generated by a send instruction to a sending channel that indicates the beginning of a transmission.

EOM—End of message is a command delivered to the target node that indicates that this is the end of a message.

EOT—End of transmission is a command delivered to the target node that indicates that this is the last packet of this transmission.

ETE_ack—The End-to-end acknowledge command indicates a transmission was delivered successfully to the target node. It includes a receive code set up by the software at the receiver end.

ETE_nack—The End-to-end not acknowledge command indicates that a message was not delivered successfully to the target node and returns status such as parity error or receive count overflow.

ETE_en—The end-to-end enable signal is sent with the address packet to indicate that the end-to-end logic at the receive channel in the target node is enabled.

Flush_path—is a flush command that deallocates and frees up all ports and channels in a path to a target node.

Reset_node—Reset_node is a command that resets a node and its ports and channels to an initial state.

Reset_CPU—Reset_CPU is a command that resets a CPU at a node but not its ports and channels to an initial state.

Rcv_rej—Receive reject is a path rejection command that indicates that no receive channel is available at the target node.

Rcv_rdy—Receive ready is a command that indicates that the receive channel is ready to accept a transmission.

Route_rdy—Route ready is a command that indicates to a send channel that a requested route to the target node and receive channel has been found and allocated for a transmission from the send channel.

Route_reject—Route reject is a path rejection command that indicates that all attempted paths to the target node are blocked.

Rt_ack—Route acknowledge is a path acknowledge command that indicates that the path that a scout packet took to the target node is available and allocated (reserved).

Send_rdy—Send ready is a status register that indicates the send channels that are ready to start a message or transmission.

Refer to FIG. 1 which is a detailed block diagram of a communications unit in which the present invention is embodied. A direct memory access (DMA) buffers and logic block (10) is connected to a main memory (not shown) via memory address (memadr) and memory data (memdat) buses. Eight receive (rcv) channels (12) are paired with eight send channels (14). A routing registers and logic block (16) is connected to the send channels via Portrt and Opselv, and to the receive channels via Opselv. A cut-through arbiter and signals block (18) is connected to the send and receive channels. A routing arbiter and signals block (20) is connected to the send channels (14) and to the routing registers and logic (16). Eighteen output port/input-port pairs (22) are connected to the cut-through arbiter and signals (18), the routing arbiter and signals (20), and to the send and receive channels via Portcut, Cutb, and Portsrc. A processor bus (prb) is connected from a central processing unit (not shown) to the receive channels, the send channels, the routing registers and logic and to input and output ports (22). The input ports are connected to the routing arbiter and signals block (20) and off-chip via the input pins (Ipins). The output ports are connected to the cut-through arbiter and signals block (18) and off-chip via the output pins (Opins).

Receive Channel

Figure 2:
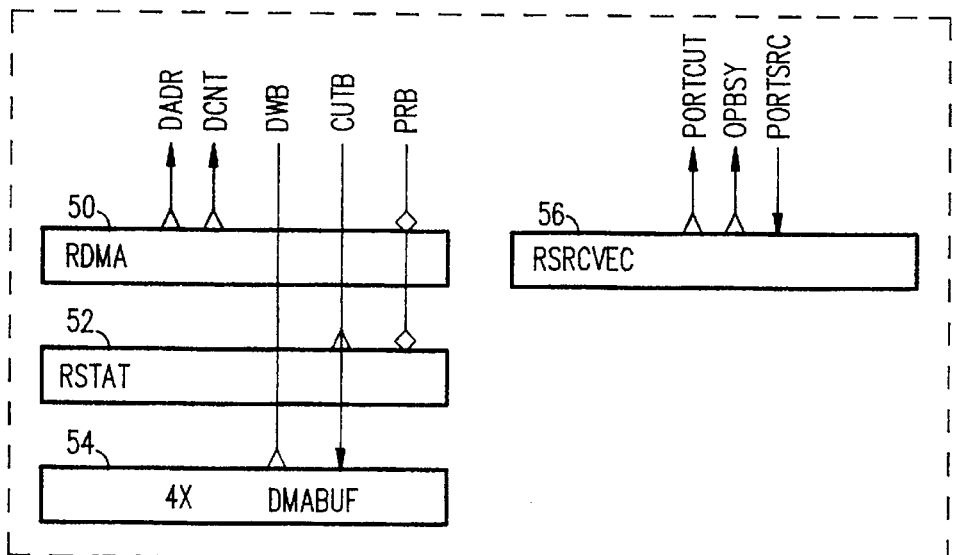
FIG. 2 is block diagram of a receive channel shown in FIG. 1.

Refer to FIG. 2 which is block diagram of one of eight receive channels (12) shown in FIG. 1. Each receive channel includes a receive direct memory access register, RDMA, (50), a receive status register, RSTAT, (52), a DMA four word-deep buffer DMABUF, (54) and a receive source vector register, RSRCVEC, (56). The input port that cuts through transmission data to this receive channel is indicated by the contents of the RSRCVEC register; which is placed on the PORTCUT bus when the receive channel returns an ete-ack or ete-nak command.

An address packet or data packet is received from an input port over the cut through bus CUTB. Data are buffered in the receive DMA buffer DMA BUF (54) before being written to memory. An address and length to describe where in memory to place the data is stored in the receive dma register (50). As data is received it is transferred over the data write bus DWB to a memory controller along with the address DADR and word count DCNT.

The receive source vector register RSRCVEC is an indication of from which input port the data was sent. An end to end (ETE) command, with end-to end (ETE) status, is sent back to the sending port from the RSTAT register (52).

Send Channel

Figure 3:
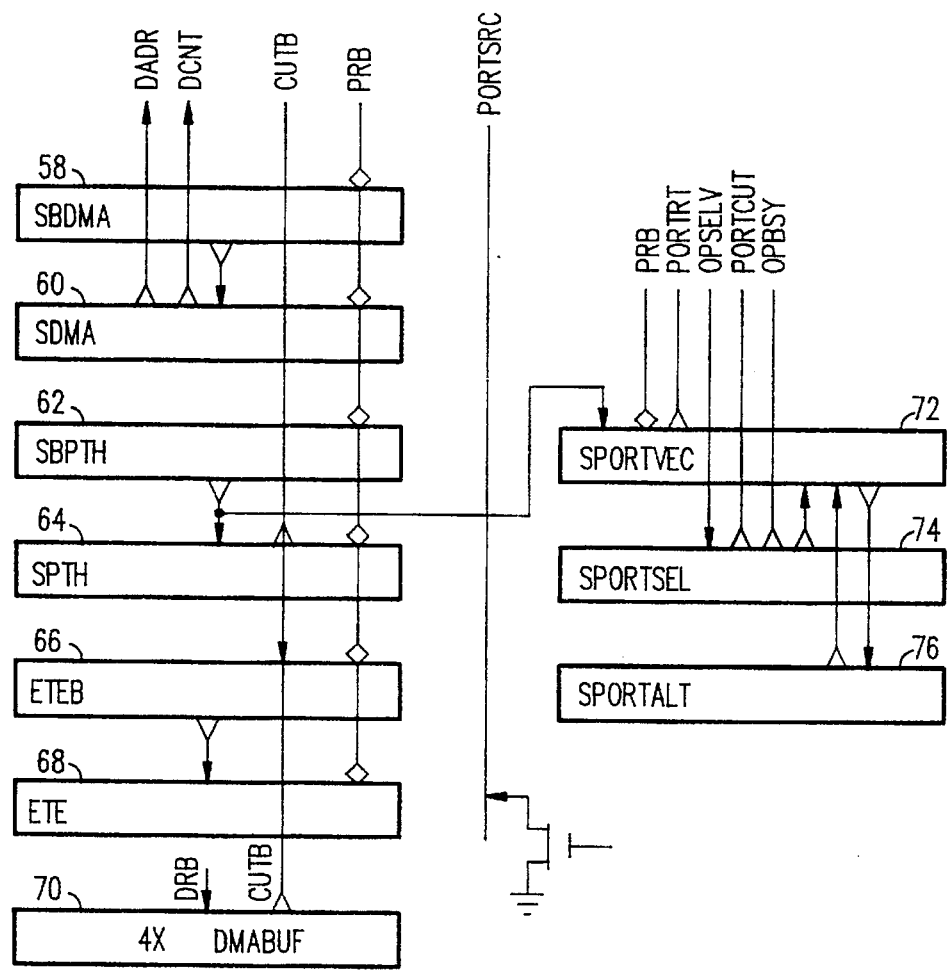
FIG. 3 is block diagram of a send channel shown in FIG. 1.

Refer to FIG. 3 which is block diagram of one of eight send channels (14) shown in FIG. 1. Each send channel includes a send buffer DMA, SBDMA (58), send DMA register, SMDA (60), send buffer path, SBPTH (62), send path register, SPTH (64), end-to-end buffer, ETEB (66), end-to-end register, ETE (68), DMA buffer, DMABUF (70), send port vector register, SPORTVEC (72), send port select register, SPORTSEL (74) and send port alternate register, SPORTALT (76).

The SDMA register (60) stores address and length fields, double queued with the SBDMA register (58). The SPTH register (64) stores port vector and node address of the destination (target) node, double queued with the SBPTH register (62). At the end of a transmission the SBDMA register (58) is popped to the SDMA register (60) and the SBPTH register (62) is popped to the SPTH register (64). At the end of a message the SBDMA only is popped, to the SDMA register.

The ETE register (68) is the top of the end-to-end (ETE) queue and the ETEB register (66) is the bottom of the end-to-end (ETE) queue. An end-to-end ETE is returned via the CUTBUS and stored in the ETEB register (66). The ETEB is popped to the ETE if the ETE is empty or invalid.

CPU Instructions access the registers by means of the PRB bus. If a SDMA register is in use, the information is placed in the buffer SBDMA(58). If SBDMA (58) is also full, a flag is set in the CPU indicating that the send channel is full. (same for SPTH and SBPTH)

The send port vector SPORTVEC (72) is in a separate path in the send channel but is part of the SPTH register. SPORTVEC stores a bit pattern indicating through which output ports the transmission may be routed. The port vector is passed by means of the port route PORTRT bus to the routing logic shown in FIG. 6. A PORTSRC line is asserted to indicate which channel or port is requesting the new route. If accepted, a vector, which is a one in a field of zeros, is sent from the routing logic via the output port select OPSEL bus to the send port select SPORTSEL register (74). The SPORTSEL register indicates the one selected output port. The send channel sends an address packet, and/or data from the DMABUF (70), to the output port via the cut through bus CUTB. The output port for the cut through is selected by placing the port select vector SPORTSEL (74) on the port cut-through select bus PORTCUT.

The SPORTVEC vector is inverted and the inverted vector is placed in the alternate port vector register SPORTALT (76). If all attempted routes fail using the SPORTSEL register, the SPORTALT register is transferred to the SPORTSEL to provide an alternate route select attempt.

The output port allocated OPALL lines, are activated to prevent another channel or port from interfering with the selected (allocated) port.

Input Port

Figure 4:
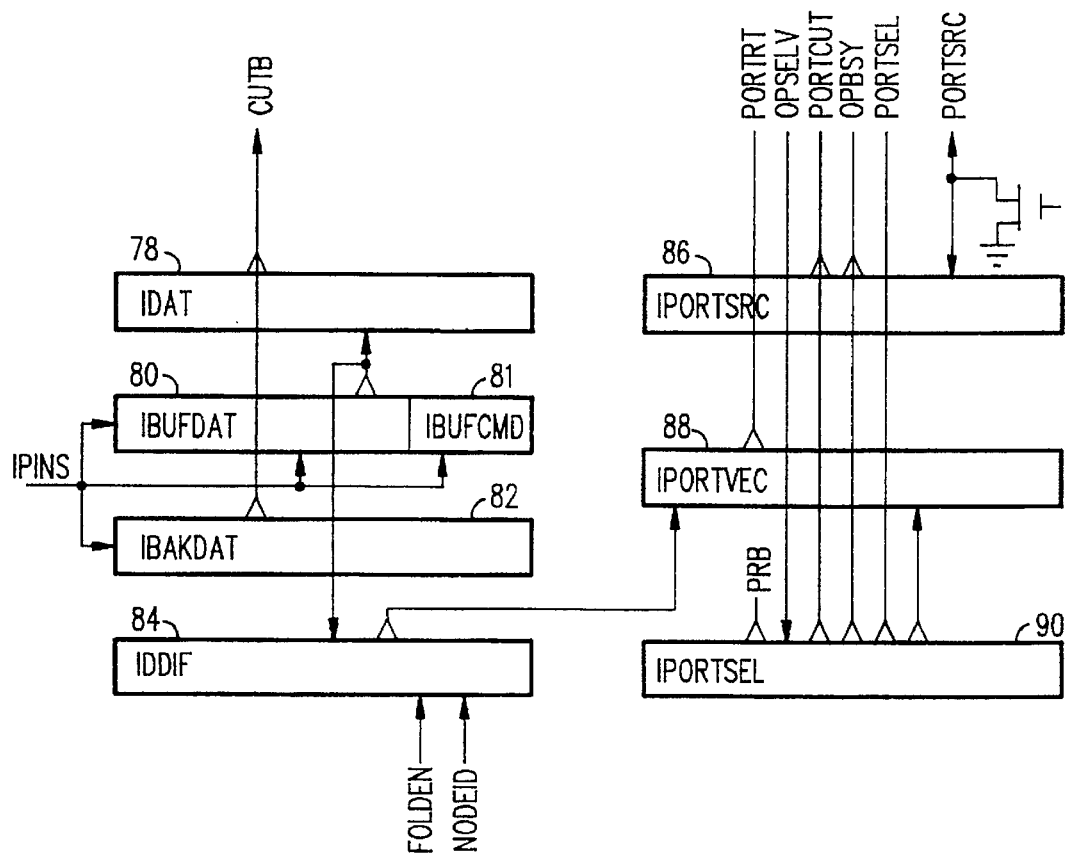
FIG. 4 is block diagram of an input port shown in FIG. 1.

Refer to FIG. 4 which is block diagram of an input port shown in FIG. 1. Each input port includes input data register, IDAT (78), input data buffer, IBUFDAT (80), input buffer command, IBUFCMD (81), input back track data register, IBAKDAT (82), identification difference register, IDDIF (84), input port source register, IPORTSRC (86), input port vector register, IPORTVEC, (88) and input port select register, IPORTSEL (90).

Pairs of bits that are shifted out of an output port of a corresponding hypercube neighbor node are shifted into the input port command IBUFCMD register (81) on the IPINS. At the front of a packet is the packet type which indicates the size of the packet. If a short packet, it is shifted into the middle of the IBUFDAT register (80). If it is back-track command, the bits are shifted into the IBAKDAT register (82). If an address is shifted in, it is compared with an address of the node, NODEID. The result is a difference vector that is loaded into the IDDIF register (84). If folding is enabled, the FOLDEN line is asserted and the ID bits corresponding to the folded port are used to modify the difference vector IDDIF accordingly. The contents of the IDDIF register are loaded into the input port vector register IPORTVEC (88) which is used to identify the next minimum path ports through which a message may be routed. The IPORTVEC is sent to the routing logic of FIG. 6 via the port route bus PORTRT. At the same time, the input port asserts its corresponding bit on PORTSRC, which is passed to the routing logic with port routing.

The output port selected by the routing logic is indicated with the OPSELV bus, which is written into the iportsel register. Also, the PORTSRC value is written into the srcvec register of the iport corresponding to the selected oport. If a back track command is received at an iport via the IBAKDAT register, SRCVEC selects the oport to which the back track data is sent. Any time data is put out on the CUTB bus, the contents of the IPORTSE/register (90) or of the SRCVEC register are put out on the PORTCUT bus to select the output port to receive the data.

Output Port

Figure 5:
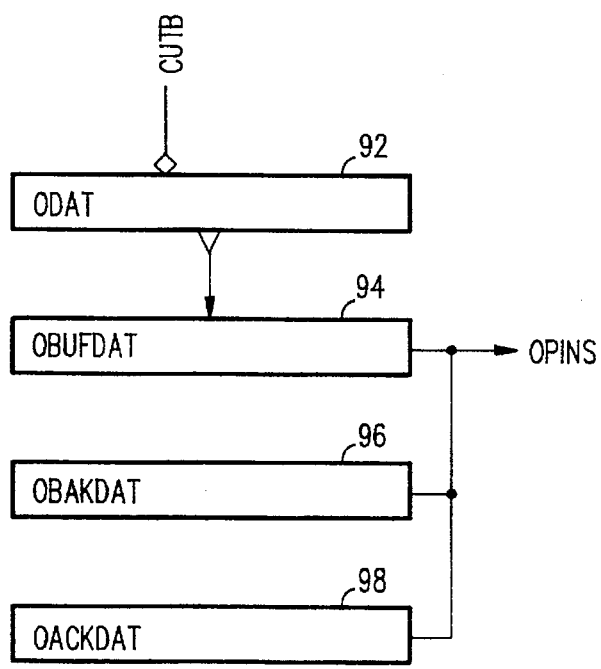
FIG. 5 is block diagram of an output port shown in FIG. 1.

Refer to FIG. 5 which is block diagram of an output port shown in FIG. 1. Each output port includes output data register, ODAT (92), output data buffer, OBUFDAT (94), output back-track data register, OBAKDAT (96) and output acknowledge data register, OACKDAT (98).

An address or data packet arrives from an input port or send channel on the cut through bus CUTB and is loaded into the output data ODAT register (92). The ODAT register is popped into the output buffer data OBUFDAT register (94) if it is not busy. If ODAT is full, an output port busy OPBSY line is asserted. The output backtrack data OBAKDAT register (96) stores backtrack commands. The output acknowledge data OACKDAT register (98) stores packet acknowledge commands. OBUFDAT register (94), OBAKDAT register (96), and OACKDAT register (98) are shift registers that shift bits out of the OPINS every clock period, two pins (bits) per clock period.

Routing Registers and Logic

Figure 6:
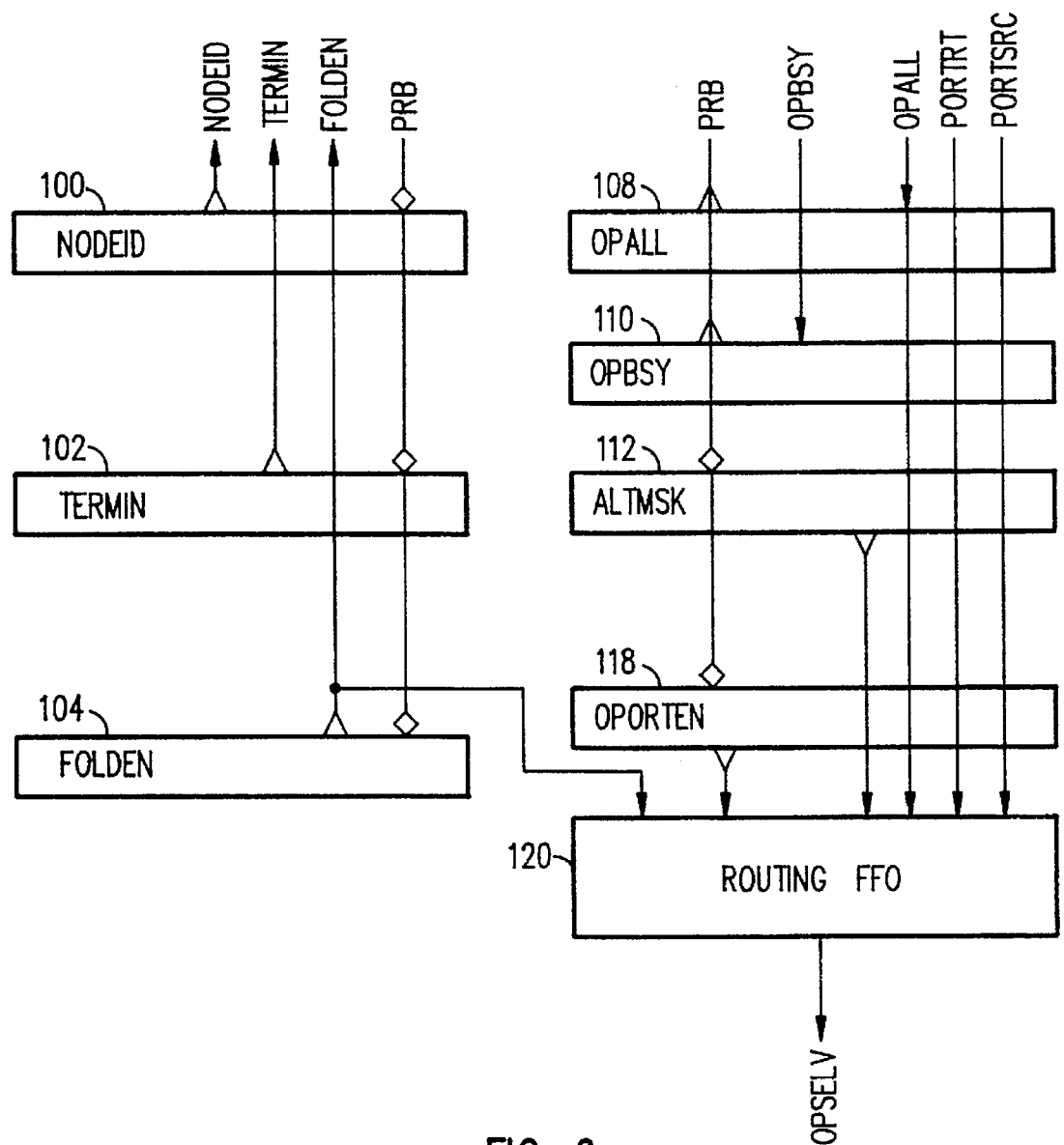
FIG. 6 is block diagram of routing registers and logic shown in FIG. 1.

Refer to FIG. 6 which is block diagram of the routing registers and logic (16) shown in FIG. 1. The routing registers include node identification register, NODEID (100), termination register, TERMIN (102), fold enable register, FOLDEN (104), output port allocation register, OPALL (108), output port busy register, OPBSY (110), alternate mask register, ALTMSK (112), input output mask, IOMSK (114), input output select, IOSEL (116), OPORTEN (118) and a routing find first one (FFO) logic(120).

The NODEID register (100) contains the node address of this processor.

The terminal register TERMIN (102)indicates which input ports are terminal ports. Terminal ports do not compare address packets with the NODEID and any address packet that arrives at such a port is accepted as having arrived at the target node.

The fold enable register FOLDEN (104) holds a vector which indicates which ports can be folded. FOLDEN is considered by the routing FFO (120) when performing a wormhole routing protocol, such that if the first port is not available but its folding partner is available, a route is set up using the folded port; or when performing a maze routing protocol, such that the folding partners of the PORTRT ports are also considered as potential routing candidates.

When a send channel or an input port is requesting a path, the PORTRT bus carries a vector which indicates all the oports from which the routing logic may choose to form the next link in the Xmission path. PORTSRC carries a vector which identifies from which channel the request comes; and the OPALL vector indicates which output ports have already been allocated.

For a wormhole routing protocol, a find first one (FFO) is performed with the routing FFO (120) on bits in the PORTRT vector, starting at the first bit position beyond the port (on the PORTSRC bus) from which a request came, and wrapping around to bit position 0 and beyond if necessary ( this is a 'helical' search). The first 'one' bit indicates the output port through which the next link in the route must be taken. If folding is enabled for this port (FOLDEN), the folded output port corresponding to this one is also available for routing and is indicated in the output vector of the FFO. This vector is masked with OPORTEN and OPALL to generate the output port select vector on the OPSELV bus. If OPSELV is all zeroes, route selection has failed, i.e. the output port required to route the next link is unavailable, and the send channel or ioport must retry the routing request until the output port becomes available.

For a maze routing protocol, the PORTRT vector is first enhanced with any folded ports as indicated by the FOLDEN register. It is then masked with OPALL and OPORTEN, before the FFO is performed. As with the wormhole case, the FFO operation starts at the first bit position beyond that indicated with the PORTSRC bus and wraps around as needed ('helical' search). Thus, for maze routing, the first available output port from the PORTRT vector will be selected and placed on the OPSELV bus. If none of the PORTRT ports is available, OPSELV will be zero and the route selections has failed. If the route request was from a Send Channel, the Send Channel will then place a route-rejection status in its ETE queue and interrupt the CPU. If the route request was from an input port, a route-rejection command will be sent back to the previous node in the path, via the output port paired with the requesting input port.

Routing Arbiter and Signals

The routing arbiter and signals (20) shown in FIG. 1 is a find-first-one (FFO) chain. The last port or send channel that was selected is saved. The next time a search is made, the search starts just beyond that last position and a round-robin robin type of priority search is conducted. Ports or send channels arbitrate for route select to get access to the routing logic (16) which will select an output port to form the next link in an transmission path. The cut-through arbiter and signals logic (18) then is invoked.

Cut-through Arbiter and Signals

The cut-through arbiter and signals (18) shown in FIG. 1 is a find first one (FFO) chain. Cut-through port allocation priority is similar to that described in U.S. Pat. No. 5,367,636, but port allocation priority is not hard-wired. The last port in the channel that was selected is saved. The next time a search is made, the search starts just beyond that last position and a round-robin type of priority search is conducted.

Maze Routing

Refer to FIG. 7 which is a maze routing example in an eight processor network dimension 3 hyper cube. A source (src) node (000) attempts a transmission to a destination or target node (111) by sending scout packets along route search paths indicated by broken lines. Scout packets encounter blocked links illustrated by the mark "+". Links from 001 to 101 and from 011 to 111 are blocked in this example. A route ready acknowledge path is illustrated by the solid line from node 111 through nodes 110 and 010, back to the source node 000. The message is then sent out to the target node 111 over the path as illustrated by the bold solid line.

Cut-through hardware

To support multi-path routing, the receive and send channels (12, 14) are logically independent of the communication ports (22). Each send and receive channel therefore needs cut-through logic to direct data to or from the selected port or ports. This cut-through logic is similar to that described in U.S. Pat. No. 5,367,636, replicated for each of the 18 ports and 8 send and 8 receive channels

Route-rejection logic

As a scout packet searches out a path, it must recognize a blocked or busy channel and respond with a rejection packet that retraces and deallocates each channel in the nodes of the scout packet's path. The retracing is done using the same baktrak paths and logic used by end-to-end acknowledge (ETE-ack)packets.

Maze route-selection and retry logic

The routes from any node along a path are selected by performing an exclusive OR (XOR) of a destination node-ID with a node ID. This is just like cut-through port selection for a fixed-router as described in U.S. Pat. No. 5,367,636, but all selected ports not already allocated, are potential paths, rather than just the lowest one. The lowest unallocated port is selected by the routing logic. A port rejection from an allocated path causes the corresponding cut-through cell to be invalidated and the next selected port to be tried. If no valid port selections remain, a rejection message is passed back to the previous node or Send channel in the path. A scout that arrives successfully at the destination node is directed to the next available Receive Channel and then retraces its path as path acknowledge message packet encoded as a rt_ack command. If the send channel receives a rt_ack command, it can start transmitting the requested message along the selected path. If all potential paths are rejected, the central processing unit (cpu) is interrupted, at which time random wait and retry is invoked by the software.

Refer to FIG. 8 which is a graph of message latency versus percent of network transmitting data. An adaptive maze router is represented by solid lines and a fixed wormhole router is represented by broken lines. Three message mixes are plotted: small (16 packets) medium (128 packets), and large (1024 packets). The vertical axis is message latency which is the number of packet time units to deliver the first packet. The horizontal axis is the percent of the network that is transmitting data, that is, the percent of network bandwidth transmitting data. The message mixes described in TABLE I are plotted for both routing types in the graph of FIG. 8.

TABLE I

| LINE PLOT | SMALL MESSAGE | MEDIUM MESSAGE | LARGE MESSAGE |
| --- | --- | --- | --- |
| A | 98% | 0% | 2% |
| B | 50% | 48% | 2 |
| C | 50% | 0 | 50% |
| D | 0% | 0% | 100% |
| E | 0& | 100% | 0% |
| F | 100% | 0% | 0% |

As shown in the graph of FIG. 8, the maze router out-performs a fixed wormhole router in most situations.

Message Protocols End-to-End reporting

A transmission may optionally hold a path until an end-to-end (ETE) acknowledge is received back at the source node from the destination (target) node. The ETE_ack or ETE_nak is sent back along the same source to target path, but in the reverse direction, from target to source, as the transmission that was delivered. The target to source path uses companion ports that transmit in the other direction along a back-track routing network. The ETE_nak includes error status that indicates "parity_error", "rcv_count_overflow", or "flushed". The ETE_ack includes a 6-bit status field set up by software at the receiver end. ETE packets are not queued behind other messages along the companion path, but are inserted between normal message packets using the back-track routing network. ETE packets are delivered to the send channel, at the source node, that initiated the transmission.

Packet Formats

Messages are delivered via packets of different types. Every data transmission begins with a 32-bit address packet, followed by 72-bit data packets, which include 64 bits of data and 8 bits of packet overhead. Message data must be double-word aligned in memory. Commands are delivered in 18-bit packets and are generated and interpreted by the hardware only.

FIG. 9 is a diagram of an address (scout) packet (32 bits):

| | |
| --- | --- |
| Start bits | –2 |
| Packet type | –2 |
| Node Address | –18 |
| Forward bit | –1 |
| Routing type | –3 |
| Reserved | –2 |
| Acknowledge | –2 |
| Parity | –2 |

FIG. 10 is a diagram of a data packet (72 bits):

| | |
| --- | --- |
| Start bits | –2 |
| Packet type | –2 |

| | |
|---|---|
| Data | –64 |
| Acknowledge | –2 |
| Parity | –2 |

FIG. 11 is a diagram of a command packet (18 bits):

| | |
|---|---|
| Start bits | –2 |
| Packet type | –2 |
| Command | –4 |
| Status | –6 |
| Acknowledge | –2 |
| Parity | –2 |

Routing types:

Bit0 indicates "oblivious" routing, i.e. only a single route is possible at any intermediate node; non-adaptive.

Bit1 indicates "progressive" routing, i.e. data wormholes behind the address—there is no circuit probe(scout packet).

Bit2 indicates "alternate" routing, i.e. mis-route to non-minimum-path neighbors when further routing is otherwise blocked.

000—"maze" routing: exhaustive back-track using a circuit probe (scout packet)

001="helix" routing: n minimum path oblivious routes tried from the sender, using a circuit probe

010=RESERVED

011=oblivious wormhole routing, (the only non-adaptive rt type)

100="alternate maze": maze until source is fully blocked, then mis-route and maze through neighbor nodes, in turn as necessary 101="alternate_helix": helix until source is fully blocked, then mis-route and helix along non-minimum paths 110="hydra": maze progressively (take 1st available minimum path port at each intermediate node, wormholing data behind) until all paths are blocked, then mis-route and maze from blocked node 111 ="oblivious_hydra": oblivious wormhole (take only 1st minimum path port at each intermediate node, wormholing data behind) until path is blocked, then mis-route and maze from blocked node.

Packet types:
00=address
01=data
10=bak-trak
routing_command(rt_rej, rcv_rej, fwd_rej, rt_ack, ETE_ack, ETE_nak)
11=fwd_message_command (EOM,EOT,flush,reset)
Commands:
stat cmd
---- ----
xxxxxx 0000=packet acknowledge
xxxxxx 0001=route ack (path ack)
xxxxxx 0010=route rejected (blocked) (path rejection)
xxxxxx0011=reserved
xxxxx0 0100=rcv_channel rejected or hydra_route rejected
xxxxx1 0100=parity_err flushed back
xxxxxx 0101=forwarded route rejected
ssssss 0110=ETE_ack (ssssss=rcv_code)
ssrrrr 0111=ETE nack (rrrr=error status; ss=rcv code)
xxxxxx 1000=EOM
xxxxx0 1001=EOT-no ETE requested
xxxxx1 1001=EOT-ETE requested
xxxxxx 101x=reserved
xxxxxx 1100=reset_CPU
xxxxxx 1101—reset_node
xxxxx0 1110=flush_path
xxxxx1 1110=parity_err flushed forward
xxxxxx 1111=reserved Node Addressing Processor IDs and destination addresses are 18-bit unique values, specifying one of 256K possible nodes in the system. The 18-bit physical node address of a target node is included in the address packet at the head of a message transmission, and as part of a "scout" packet (circuit probe) when a maze route is being established.

Logical to physical node address conversion, node address checking, and port_vector calculation for a new Transmission Send are done directly by system software.

Message Routing

A message can be routed any of seven ways, as listed under routing types table in the packet formats section above. A programmer selects the routing method via the routing-type field in the operand of the "Set_Path" or "Send" instruction.

Oblivious wormhole routing is a "fixed" routing scheme. A message from a given source to a given destination takes exactly one unique predetermined routing path. The path taken is the lowest-order uphill minimum-length path. The message, node address followed immediately by message data, worms its way toward the destination node, not knowing if the path is free and never backing out, but blocking on busy ports as it encounters them and continuing on when the busy port frees up.

Maze routing in accordance with the present invention is an adaptive routing scheme. For a message from node_A to node_B, all minimum-length paths between the two nodes are searched one at a time (actually, paths in which the first leg is non-minimum may optionally be tried also) by a single-packet scout, starting with the lowest uphill path and doing a depth-first helical traversal of the minimum-path graph until a free path to the destination is found. The successful arrival of a scout packet at the destination establishes the path. Then, once a path_acknowledge packet is delivered back to the sender, this reserved path is used to transmit the message. If no free path is found, however, an interrupt is generated at the source node, whereupon the software may retry the path search after an appropriate delay or use alternate routing (and/or using a different set of first-leg paths).

Maze routing protocol

In a maze router, a transmission from a source (sender) node to a destination (target) node cannot be accomplished until a path is established from a Send Channel at the source node to a Receive Channel at the target node. The path is established as follows:

At the Sender node

Each of the source's Send channels has associated with it a send_port_vector (SPORTVEC), provided to it by the software via a Send instruction, which indicates the output ports of the sender's node through which the routing will initially be attempted. These ports may or may not start minimum-length paths. This first hop may thus route nonminimally, while all subsequent hops will take only minimum paths to the target. In other words, the maze router does an exhaustive search of minimum paths between a set of nodes, that set including the source node and/or some number of its immediate accessible neighbors, and the target node.

A scout packet, including the node address of the target node, is sent out the first of the source's selected output ports which is enabled and free, and is thus delivered to a neighboring node, the next node in a potential path to the target node. The path from the Send Channel to the selected output port is now locked, reserved for the pending transmission, unless a path_rejection packet is subsequently received on the corresponding input port. If the selected output port receives a path_rejection packet, because all paths beyond the next node are blocked, a new output port from the send_port_vector will be selected, if available, and the scout packet sent out that port. When no more send_port_vector output ports are available, because they were blocked or rejected, an "all_paths_blocked" status is pushed into the ETE queue for the respective Send channel, the CPU is interrupted, and the Send channel goes into a wait state, waiting for software to clear it. If, however, a path acknowledge messge packet encoded as a rt_ack command is received, it is passed back to the Send_DMA_Channel that initiated the search and the selected path remains reserved for the subsequent transmission, which can now be started.

At the Target node

A node that receives a scout packet at one of its input ports first compares the target node address from the scout packet with its own node ID. If they match, the scout packet has found the target node. If a receive channel is free, the scout packet is delivered to it and a path acknowledge message packet encodes as a rt_ack command is sent all the way back to the source (sender) node, retracing the successful legs of the scout's path. If a receive channel is not available, a path_rejection packet, encoded as a "rcv_channel unavailable" command, is sent back to the source node via the established path and the input port is freed-up.

At Intermediate nodes

If a receiving node's node ID does not match the target node address, then this node is an intermediate node and it will attempt to deliver the scout packet to the next (neighboring) node along a minimum-length path to the target node. The XOR of the target node address with this node's node ID, the Hamming distance between them, indicates which output ports connect to minimum paths, and is latched in the IPORTVEC register as the cut-through vector. The output port paired with this input port, i.e. the link back to the node from where the scout just came, is disqualified from the cut-through vector, thus preventing any cycles that could be caused by non-minimal routes (which are allowed on the first hop). If folding is enabled, the bits corresponding to the folded partners of the cut-through vector are also asserted. The scout packet is sent out the first of the cut-through output ports, starting beyond this input port, which is enabled and free. The path from the input port to the selected output port is reserved for the pending transmission, unless and until a path_rejection packet is received on the output port's companion input port. If a path_rejection packet is received, because all minimum paths beyond the next node are blocked, a new cut-through port will be selected, if available, and the scout packet sent out that port. When no more cut-through ports are available from this node, a path_rejection packet is sent to the previous node, the one from which the scout packet got here, and the input port is freed-up. If, however, a path_acknowledge packet is received, it is passed back to the source node via the established path and the selected path remains reserved for the subsequent transmission.

The above process is continued recursively until a free path to the target is found and established, or until all desired paths from the source node have been tried and failed.

Path_Cmd packets:

A scout returns path_rejection status to the previous node, or path_found status to the source node, by sending back a path_cmd packet. Path_cmd packets are sent back along a path using the path's "companion" ports, just like an ETE packet. There are two kinds of path_cmd packets. A "path_acknowledge" packet, indicating that the scout has established a path to the destination node, is delivered all the way back to the source, leaving the path established for the subsequent transmission. A "path_rejection" packet, indicating that the scout has been completely blocked at an intermediate node, is delivered to the previous node in the path, clearing the path (this last hop) along the way. A new path from that node may now be tried or, if no new paths remain open from that node, it will in turn send a "path-rejection" packet to its antecedent node. If it has no antecedent node, i.e. it is the source node, the rejection packet is placed into the ETE queue, the Send DMA channel goes into a wait state, and the CPU is interrupted.

Routing Retry using Alternate Send_Port_Vector

If the routing logic fails to find a path using the given send_port_vector, an alternative set of paths may optionally be attempted before interrupting the CPU.

When alternate routing is enabled, and after the initial set of routes has failed, the initial send_port_vector is inverted and and'ed with the alternate_port_mask to create a new send_port_vector. Then, a second attempt is made at finding a route, through neighboring nodes that were not used in the initial try. If the alternate routes also fail, the CPU is then interrupted in the usual manner.

Non-minimum paths through alternate send ports are exactly two hops longer than minimum, since all roudestination node after the first hop. If a source and destination node are separated in j dimensions, the minimum path distance is j hops and the alternate path distance is j+2 hops.

Attempting alternate routes can be especially important for transmissions to target nodes that are only a short distance away. For example, there is only one minimum-length path to a connected neighbor, yet by attempting routes through all the other neighbors, there are a total of n unique paths to any nearest neighbor in a cube of dimension n as described by the alternate mask.

There is one Alternate_Port_Mask per node, but alternate routing is enabled on a per-transmission basis (a bit in the path-setup operand of the SEND instruction).

Folding

Folding increases the number of output ports available for routing a message in a non-maximum-size system. Any of the connections from the lower 8 output ports to the corresponding input ports of nearest_neighbor nodes, can be duplicated on the upper 8 output ports, in reverse order, to the same nearest_neighbor nodes. In other words, any subset of the interconnect network can be duplicated on otherwise unused upper ports.

If folding is enabled (see FOLDEN_register, FIG. 6), then when a port vector (PORTVEC) is calculated at an intermediate node, any selected ports that are folded will enable their respective companion ports to also be selected into the port vector.

At any hop of a wormhole route, either of the two folded ports, that duplicate the link for the desired dimension, may be used. Folding thus greatly improves the chances of a wormhole route finding its way to the target with minimal or no blocking.

For a maze route, folding increases the number of minimum-path links that can be tried at each hop, and thus improves the chances of finding an open path.

Forwarding

The maze router finds a route to the forwarding node, reserves that path, then transmits the next address (fetched from the message data) to that node, whereupon the address is maze-routed from there to the new node. This can be repeated as long as new addresses are forwarded, or until a route cannot be found, in which case the entire path is unraveled and deallocated and a "forward_route_rejected" command is delivered to the send channel's ETE queue. On the other hand, if a path to the final target node is established, the message data is then transmitted normally from the source to the target.

Communication Direct Memory Access (DMA) Channels

A message is transmitted from a contiguous block of physical memory at the sender to a contiguous block of physical memory at the receiver, in increments of double-words (64 bits). To provide memory access and message and path control at both ends of the transmission, there are eight Send DMA Channels and eight Receive DMA Channels at each processor.

DMA channels are set up with the appropriate SEND or RECEIVE instruction. A Set_DMA instruction is also provided to assist in setting up the DMA operand of the SEND or RECEIVE instruction. The SEND and RECEIVE operands provide path control, messaging parameters, addresses, etc. for the DMA channels and routing logic.

In order to reduce page-mode page-break limitations on DMA memory bandwidth, each channel, send or receive, buffers up to 32 bytes of data. This corresponds to 4 double-word (64-bit) memory accesses. Messages must be aligned on double-word boundaries and sized in double-word-multiples.

Send_DMA

Each Send channel has associated with it a physical memory address and a message length, stored in its DMA register, as well as a destination node ID and a send_port_vector, stored in its Path register. The Send channels are double-buffered, such that the DMA and Path control descriptors of the next message can be setup while the current one is being transmitted. Communications software can use this feature to hide messaging overhead and to efficiently implement send-chaining.

After a Send channel has been setup for a new transmission, it first enters the routing state to establish a path to the target node. The path is established once the address packet is transmitted to the output port, if routing progressively, or when a path_acknowledge packet is received by the channel, if routing maze.

If the node address is forwarded, the send channel enters the forwarding state and transmits address packets from the message data until the last address packet is not marked as forwarded. If routing maze, the channel waits for a path_acknowledge after each address is transmitted.

Once a Send channel establishes a path to the target node, it commences reading the message data from memory and transmitting it along the path to the target node. As the message data is fetched, the memory address is incremented and the message length is decremented, until the length counter reaches zero. When the send counter reaches zero, an End-of-Message (EOM) or End-of-Transmission (EOT) packet is sent, depending on the EOT-enable bit of the channel setup.

If it's an EOM, the DMA register is cleared and a new one popped in from the Send buffer. If it's an EOT and ETE is not enabled, the DMA and Path registers are both cleared and reloaded from the Send buffer. If it's an EOT and ETE is enabled, the Send channel is not cleared in any way, but waits for the ETE packet. When the ETE packet arrives, it is pushed into the ETE Queue, and the Send channel (both registers) is cleared. The Send channel then moves on directly to the next transmission (pops the Send buffer) if it's ready. Whenever the Send buffer is popped due to an EOM or EOT condition, the CPU is also interrupted to indicate that a free Send channel is now available. ETE also generates an interrupt if interrupt is enabled.

When maze routing, the ETE queue is also pushed with status information if a route could not be found to the target node. In this case, the path_rdy bit is cleared, an ETE interrupt is raised, but the DMA channel is not popped, cleared, or reloaded. A programmer can subsequently clear the Send channel by writing to the corresponding DMA register.

An ongoing Send transmission can be stopped by clearing the DMA_rdy bit in the channel's DMA register. This stops the transmission, but leaves it in the transmitting state. The DMA_rdy bit can be cleared by writing a 1 to the respective bit, corresponding to the send channel, of the Send_rdy register (see Send Channel Status Registers).

A blocked or stopped Send transmission can be flushed by writing a 1 to the respective bit, corresponding to the send channel, of the Send_transmission_rdy register (see Send Channel Status Registers).

When a message is flushed, a flush-cmd packet traverses the allocated path, clearing and deallocating the path behind it.

End-to-End Queue

For each Send channel there is an End-to-End (ETE) Queue, into which ETE status, from the target node's receive channel, or route_rejection or error status is pushed. When status is pushed into the ETE queue, an ETE interrupt is generated. The queue is 2 entries deep and a processor register, one for each send channel, contains both entries. A programmer can read an ETE queue, without side effects, via a RDPR instruction. The programmer can then clear an ETE entry by writing a zero into its valid bit, via a WRPR instruction (though they must be read together, each entry in the queue can be written separately). When the first entry is cleared (popped) in this way, the second entry is automatically copied into its place and cleared. The Send channel cannot start a new transmission while the ETE Queue is full.

Send Operation

Figure 12:
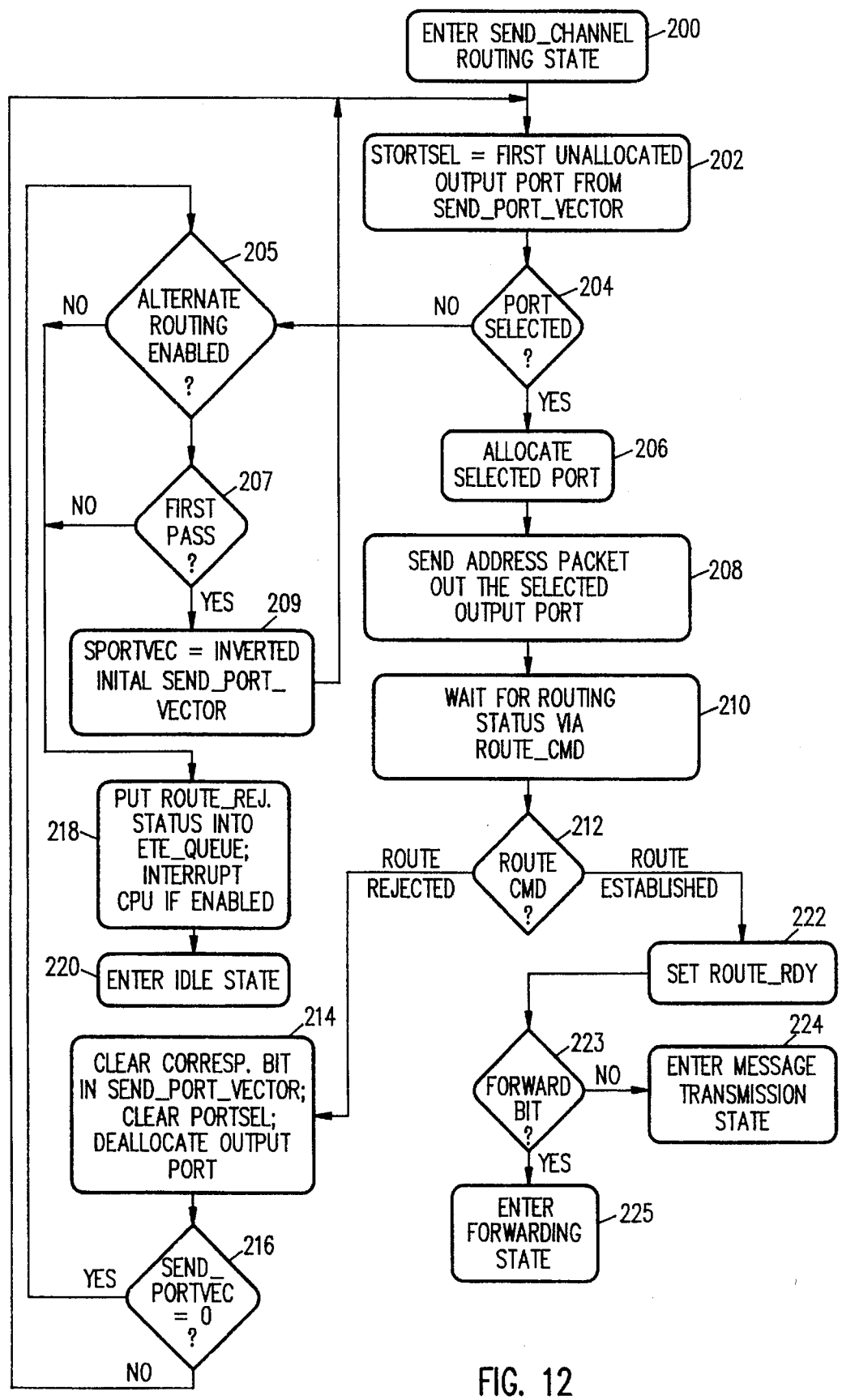
FIG. 12 is a flow diagram of the routing state of a send operation.

FIG. 12 is a flow diagram of a send operation. From an idle state, the send channel enters the routing state (200). The first unallocated output port is selected from the send port vector (202). If a port is selected (204), the flow proceeds to block (206). The send channel allocates the selected port, and sends the address packet out of the selected output port (208). The send channel then waits for routing status to be returned via the route command (210).

When the route command arrives, the status (212) is either route rejected or route established.

If at block (212) the status is route rejected, the send channel clears the corresponding bit in the send port vector, clears port select, and deallocates the output port it had allocated at block (206). If the send port vector is now reduced to 0, and alternate routing is not enabled (205), or if enabled but this is not the first pass (207) through the sequence, the send channel pushes route_rej status onto the ETE queue and if interrupt is enabled, the send channel interrupts the CPU (218). The send channel then enters the idle state (220).

If at block (212) the route is established, route_ready is set (222) and the forward bit is checked (223). If the forward bit is set, the forwarding state is entered (225). If not, the enter message transmission state is entered (224). The send channel transmits data to the target node until the message count is 0.

If at block (204) a port is not selected, the flow proceeds to.). decision block (205). If alternate routing is enabled, and this is a first pass through the flow sequence (207), the SPORTVEC is made equal an inverted version of the initial send_port vector (209). Thus when all initially attempted routes fail using the initial SPORTVEC, the inverted version provides an alternate route select attempt as the flow proceeds to block (202). The first unallocated output port is selected from the now inverted send port vector (202). If a port is selected (204), the flow proceeds to block (206). If a port is not selected (204), the flow proceeds to block (205). Alternate routing is enabled (205), but this is not the first pass (207) through the sequence, so the flow proceeds to block (218). The send channel pushes route_rej status onto the ETE queue and if interrupt is enabled, the send channel interrupts the CPU (218). The send channel then enters the idle state (220).

Receive DMA

Each Receive channel has associated with it a physical memory address and a message length (also called the receive count), stored in its respective DMA register. It also has a rcv_status register that includes error status and the receive code. As a message flows through the channel, the address increments and the message length decrements, until the length counter reaches zero or until an EOM/EOT packet is received.

If a Receive channel receives an EOM or EOT before the counter has reached zero, or immediately after it reached zero, the message has successfully completed and the channel returns to the idle state, clearing dma_rdy. If no receive errors occurred during the reception, a rcv_rdy interrupt is raised. Otherwise, a rcv_err interrupt is raised.

For example, if a parity error is detected anywhere along the transmission path, a parity_err flush_message is delivered forward, to the receive channel of the target (as well as back to the send channel of the sender). The parity error or flush bits in the receive status field are set and the target CPU is interrupted with a rcv_err interrupt by the receive channel.

If the receive counter reaches zero, the message should be complete and the next packet should be an EOM or EOT. If it is not, the rcv_count_overflow flag in the receive status field is set, and all further packets are ignored, i.e. simply shifted into oblivion, until an EOM or EOT is received, at which point a rcv_err interrupt is generated. The counter wraps and continues to decrement (the address does not increment), thus providing a way for a programmer to calculate how far the message overflowed.

A programmer can read the receive status, message count, etc. at any time, by simply reading the processor registers associated with the channel.

Scatter/Gather at the Receive Channel

To facilitate fast "gather" functions at the receiver, the programmer can optionally set the "ignore_EOM" flag at the receive channel for a given transmission (see Receive instruction description). Thus, the sender may gather disjoint bundles of data, as individual messages, into a single transmission, and the receiver can be set up to ignore the message boundaries for the length of the entire transmission, and thus store the bundles sequentially in a single DMA operation, rather than taking an interrupt and setting up a new receive_DMA after every message.

To implement a "scatter" function, the programmer can optionally set the "force_EOM" flag at the receive channel. Thus, the sender may deliver a sequential block of data in one message, and the receiver can be set up to force message boundaries for sub-lengths of the transmission, and thus scatter the data in sub-blocks to different areas in memory. The receive channel is set up with a length shorter than the incoming message, and when the length counter drops to zero, the receive channel treats it as an EOM and blocks the incoming data until new DMA parameters are set up by the programmer. This is especially useful for DMA'ing a message across virtual page boundaries that may map to disjoint physical memory pages.

Routing From an Input Port

Figure 13:
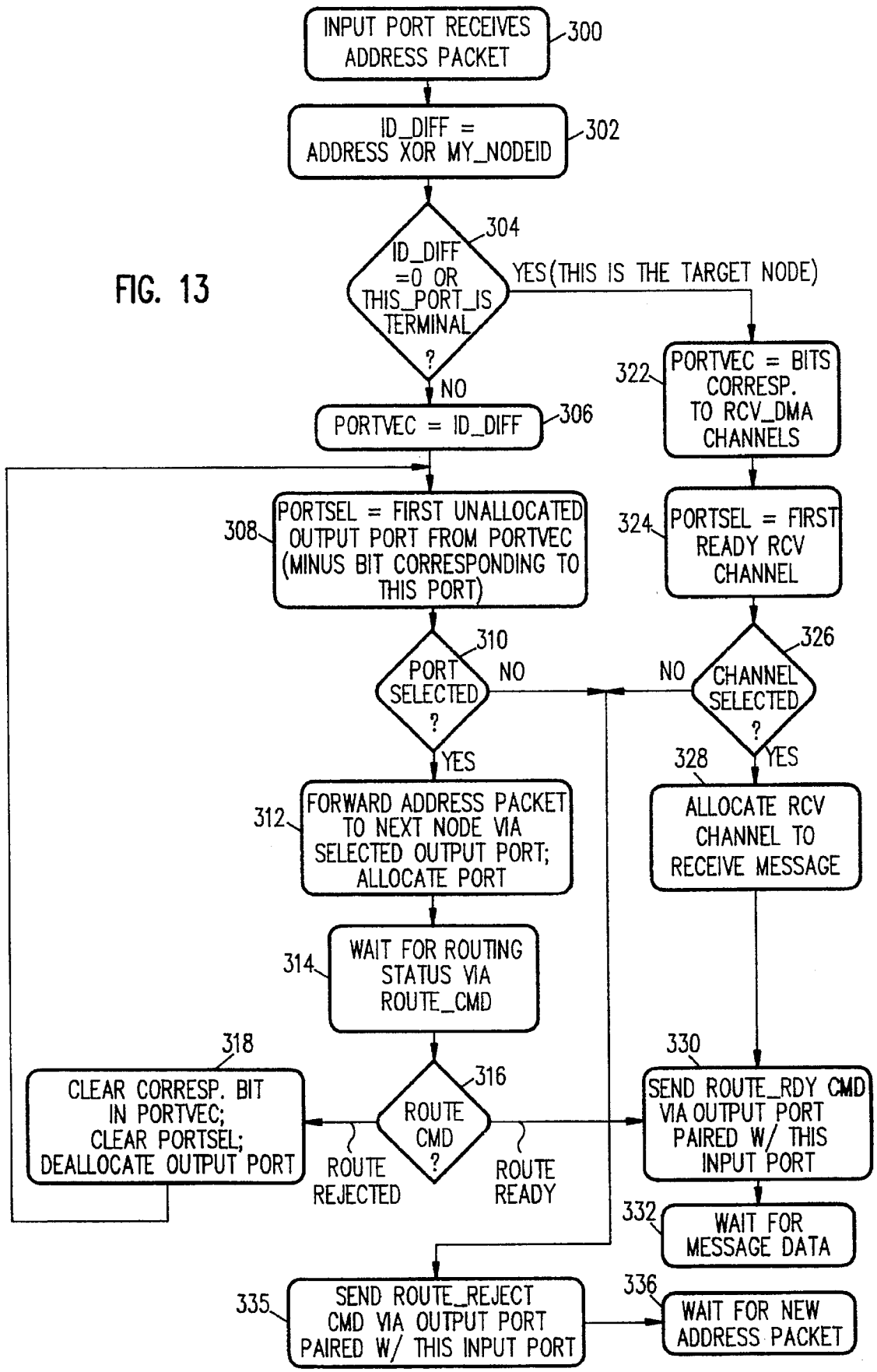
FIG. 13 is a flow diagram of the routing state of an input port operation.

FIG. 13 is a flow diagram an address packet input port operation. The input port receives an address packet (300) and computes the exclusive OR of the address in the address packet with the Node ID of this node (302). The result is ID_diff. If ID_diff is 0 or if the input port is designated as a terminal, then the flow proceeds to block (322). If not, then the flow proceeds to block (306).

At block (306) the port vector (portVec) is generated and used to select the first unallocated output port (308).

At block (310), if a port is not selected, then the input port sends a route_reject command via the output port paired with this input port (335), and waits for a new address packet (336).

If a port is selected (310), then an address packet is forwarded to the next node via the selected output port (312) and the port is allocated. The transmission path through this node is now setup and the input port waits for routing status that will be supplied by an incoming route command (314). A route command (316) will either indicate that the route is rejected or that the route is ready. If rejected, the flow proceeds to block (318). If ready, the flow proceeds to block (330).

At block (318), the receive channel clears the corresponding bit in the port vector, clears port select, and deallocates the output port allocated at block (312). The input port selects the next unallocated output port from the port vector (308) via the routing logic, and the flow proceeds as described above.

At decision block (304), if the node ID is equal to the address in the address packet or this port is terminal, then this node is the target node and the flow proceeds to block (322).

At block (322) the port vector (portVec) is generated and used to select the first ready receive channel (324). If a channel is selected (326), then the input port allocates a receive channel to receive the message (328). The input port sends a route ready (route_rdy) command via the output port paired with this input port (330) and waits for message data to arrive (332).

At block (326), if a channel is not selected, then the input port sends a route_reject command via the output port paired with this input port (335) and waits for a new address packet (336).

End to End Reporting

FIG. 14 illustrates end-to-end acknowledge. At the source node (350), the send channel sends a message packet out of an output port (352) to an intermediate node (355) that receives the message at an input port (354). The message is sent by the intermediate node (354) out of an output port (356). The message travels from node to node until the target node (358) receives the message packet. A receive channel is allocated (362) and an ETE ack message is sent back over the same path by using the output ports the are paired with the respective input ports in the path (ports 361,353, and 351 ). The message path is held until the ETE ack is received at the source node and receive status is returned with the ETE ack. For each Send channel there is an End-to-End (ETE) Queue, into which ETE status is pushed. When End-to-End status is pushed into the ETE queue, a Send_rdy and ETE interrupt are generated, depending on the status.

FIG. 15 is a maze route timing diagram wherein there are no blocked links.

FIG. 16 is a maze route timing diagram wherein there are blocked links and wherein back-tracking is invoked While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a network of interconnected nodes;
   each node including a processor;
   each of said processors in said network being assigned a unique processor identification (ID);
   an apparatus for establishing a communication path through a node of said network comprising:
   a plurality of input ports;
   a plurality of output ports;
   each one of said input ports being paired with a corresponding one of said output ports;
   control means at one input port of said input ports of a said node for receiving an address packet related to a current message transmitted from an output port of another of said nodes;
   a router connected to said one input port and to said output ports;
   registering means for registering said processor identification (ID);
   comparing means connected to said control means and to said registering means for comparing a target node address in said address packet with said processor ID;
   said comparing means including means for creating a first condition provided that said ID is equal to said target node address and, alternatively, a second condition provided that said ID is not equal to said target node address;
   a plurality of receive channels connected to said router;
   allocation means connected to said comparing means and to said receive channels for allocating to said one input port, one of said plurality of receive channels upon occurrence of said first condition; and,
   first means connected to said comparing means and to said control means for sending a route ready command over said output port paired with said input port upon occurrence of said first condition.

2. The combination in accordance with claim 1 further comprising:
   a port vector;
   second means connected to said comparing means and to said router for selecting a first unallocated output port from said port vector upon occurrence of said second condition that said node address is not equal to said target node address; and,
   third means connected to said second means and to said input port for forwarding said address packet to a next node over said first unallocated output port.

3. The combination in accordance with claim 1 further comprising:
   means for selecting a first unallocated output port connected to a third unallocated node; and,
   means for forwarding said address packet to said third node via said first unallocated output port.

4. The combination in accordance with claim 2 further comprising:
   means for selecting a first unallocated output port connected to a third node; and,
   means for forwarding said address packet to said third node via said first unallocated output port.

5. In a network of interconnected nodes;
   each node including a plurality of input ports and a plurality of output ports, each one of said input ports being paired with a corresponding one of said output ports;
   a method of establishing a communication path through a node of said network comprising steps of:
   A. receiving at an input port of a first of said nodes a first address packet having a target node address therein, said first address packet being related to a current message sent from an output port of a second of said nodes;
   B. comparing at said first node said target node address in said first address packet with a processor identification ID of said first node;
   C. allocating a receive channel of said first node to receive a message upon a first condition that said processor ID is the same as said target node address; and,
   D. sending a route ready command to said second node over said output port paired with said input port at said first node upon said first condition that said processor ID is the same as said target node address.

6. The method in accordance with claim 5 comprising the further steps of:
   E. selecting a first output port connected to a third node; and,
   F. forwarding said address packet to said third node via said selected first output port.

7. The method in accordance with claim 6 comprising the further steps of:
   G. receiving a route command; and,
   H. sending a route reject command via said output port paired with said input port.

8. A communication apparatus in which a message can be routed a number of ways in response to an address packet that includes programmable control information that enables the finding and establishing of a route to a destination target node from a source sender node, comprising:
   a maze router mechanism;
   said maze router mechanism being an adaptive routing mechanism in which for a message from a particular node to a next node, paths between said particular node and said next node are searched one at a time by a scout packet until a free path is found and established, resulting in an established path from said sender node through said particular node;
   means at said particular node for sending a path command packet from said particular node back to said sender node, said path command packet being sent out of a particular node output port paired with a particular node input port over which said scout packet was received;

a fixed-router mechanism;

said fixed-router mechanism being an non-adaptive routing mechanism in which for a message from one node to a next node, one unique predetermined routing path between said one node and said next node is established; and, mode selection means responsive to said address packet for selecting either said maze router mechanism or said fixed-router mechanism.

9. A communication apparatus comprising:

a memory address bus;

a memory data bus;

a direct memory access buffers and logic block connected to said memory address bus and to said and memory data bus;

a plurality of receive channels;

a plurality of send channels;

a plurality of routing registers connected to said send channels and to said receive channels;

a cut-through arbiter connected to said plurality of receive channels and to said plurality of send channels;

a routing arbiter connected to said plurality of send channels and to said routing registers;

a processor bus connected from a central processing unit to said receive channels, said send channels and said routing registers and logic;

a plurality of input ports;

a plurality of input pins;

said plurality of input ports being connected to said routing arbiter and to said input pins;

a plurality of output ports; and, a plurality of output pins;

said plurality output ports being connected to said cut-through arbiter and to said output pins;

said plurality of input ports and said plurality of output ports being connected to said cut-through arbiter, said routing arbiter, and to said send and receive channels.

10. The communication apparatus in accordance with claim 9 further comprising:

mode selection means connected to said cut-through arbiter and to said routing arbiter for selecting either said cut-through arbiter or said routing arbiter;

one of said input ports including means for receiving an address packet that includes control information that enables the finding and establishing of a route to a destination node from a source node.

11. A method comprising steps of:

A. selecting a first unallocated output port from a send port vector to provide a selected output port;

B. allocating said selected output port to a send channel;

C. sending an address packet out of said selected output port to a target node;

D. receiving at said send channel a route command containing routing status returned from said target node, said routing status specifying either route rejected or route established;

E. clearing a bit corresponding to said selected output port in said send port vector upon a condition that said routing status is route rejected; and, F. deallocating said selected output port from said send channel.

12. The method in accordance with claim 11 comprising the further steps of:

G. pushing route rejected status onto an end-to-end (ETE) queue upon a condition that said step E results in said send port vector being reduced to zero.

13. The method in accordance with claim 11 wherein said address packet includes a forward bit, said method comprising the further steps of:

G. setting a route ready status upon a condition that a mute is established;

H. entering a forwarding state upon a condition that said forward bit is set in said address packet; and, I. entering a message transmission state upon a condition that said forward bit is not set in said address packet.

14. The method in accordance with claim 11 comprising the further steps of:

G. inverting said send port vector to provide an alternate send port vector upon a condition that said routing status is route rejected; and, H. using said alternate send port vector to select a first unallocated output port from said alternate send port vector to provide said selected output port.

15. A method comprising steps of:

A. receiving an address packet at an input port, said input port being part of a node having a node ID, said address packet including an address;

B. computing an exclusive OR of said address in said address packet with said Node ID, a result of said exclusive OR being a port vector;

C. selecting a first output port specified in said port vector to provide a selected output port upon a condition that said result is not equal to zero;

D. forwarding an address packet to a next node via said selected output port;

E. receiving routing status at said receive channel via an input port, said routing status being supplied by an incoming route command, said route command indicating either that a route is rejected or that said route is ready;

F. clearing a bit in said port vector corresponding to said output port upon a condition that said route command indicates that a route is rejected; and, G. deallocating said output port from said input port.

16. The method in accordance with claim 15 comprising the further steps of:

I. sending a route ready command via an output port paired with said input port upon a condition that said route command indicates that a route is ready.

17. The method in accordance with claim 15 comprising the further steps of:

I. sending a route reject command via an output port paired with said input port upon a condition that said step C of selecting a first unallocated output port specified in said port vector to provide a selected output port results in no port being selected.

18. The method in accordance with claim 15 comprising the further steps of:

I. generating a port vector upon a condition that said result is equal to zero;

J. selecting a first ready receive channel using said port vector to provide a port select vector;

K. selecting a first unallocated input port specified in said port select vector to provide selected output port;

L. allocating said first ready receive channel to receive a message upon a condition that an input port is selected; and M. sending a route ready command via an output port paired with said input port.

19. A method of transmitting a message through a node comprising steps of:
   A. storing a fold enable vector in a fold enable register, said fold enable vector indicating by identification bits which ports are selected to be folded ports;
   B. receiving a message packet that includes address bits at an input port of said node;
   C. shifting said address bits into an address field of an input port command register;
   D. comparing said address field with an identification address of said node resulting in a difference vector;
   E. loading said difference vector into an identification difference register;
   F. asserting a FOLDEN line upon a condition that folding is enabled;
   G. modifying said difference vector with said identification bits corresponding to said folded ports;
   H. loading said contents of said identification difference register into an input port vector register;
   I. using contents of said input port vector register to identify a next minimum path port through which a message may be routed;
   J. calculating a cut-through vector at an intermediate node; and,
   K. storing a port cut vector indicating which port, send channel or receive channel to cut through.

20. A method of message transmission between a plurality of nodes comprising steps of:
   A. pairing each of a number of input ports at each node with an associated output port of each node;
   B. allocating an originating node send channel at an originating node;
   C. sending a message packet out of an originating node output port selected by said originating node send channel to a first intermediate node input port that is connected to said originating node output port, said originating node output port being paired with an originating node input port;
   D. receiving said message at said first intermediate node input port, said first intermediate node input port being paired with a first intermediate node output port;
   E. connecting a second intermediate node output port to said first intermediate node input port, said second intermediate node output port being paired with a second intermediate node input port;
   F. connecting said first intermediate node input port to said second intermediate node output port;
   G. receiving said message at a target node input port connected to said second intermediate node output port, said target node input port being paired with a target node output port that is connected to said second intermediate node input port;
   H. allocating a target node receive channel at said target node;
   I. composing, at said target node receive channel, an end_to_end acknowledge message containing receive status; and,
   J. sending said end_to_end acknowledge to said target node output port paired with said target node input port, upon a condition that a message transmission has completed.

21. The method in accordance with claim 20 comprising further steps of:
   K. disconnecting said second intermediate node output port from said first intermediate node input port upon receipt of said end_to_end acknowledge message.

22. The communication apparatus of claim 8 wherein a transmission from said sender node to said target node is accomplished over a path established from a send channel at said sender node to a receive channel at said target node, said apparatus further comprising:
   a plurality of input ports at said sender node;
   a plurality of output ports at said sender node;
   each one of said input ports being paired with a corresponding one of said output ports;
   a plurality of send channels at said sender node;
   each of said send channels having associated with it a send port vector;
   said send port vector indicating selected output ports of said sender node through which maze routing is to be attempted;
   said scout packet being sent out of a first output port of said selected output ports of said sender node, and thereby delivered to an intermediate node, said intermediate node being a next node in a potential path to said target node;
   means for locking a path from said send channel to said first of said selected output ports of said sender node, so that said output port is reserved for a pending transmission; and,
   means for unlocking said path from said send channel to said first output port upon a condition that a path rejection packet is subsequently received on a corresponding input port paired with said first output port.

23. The communication apparatus of claim 22 further comprising:
   means for selecting a new output port from said send port vector upon said condition that a path rejection packet is received on said corresponding input port paired with said first output port; and,
   means for sending said scout packet out said new output port.

24. The communication apparatus of claim 22 further comprising:
   means for starting a transmission from said sender node to said target node over a path established from said send channel at said sender node to a receive channel at said target node, upon a condition that a path acknowledge packet is received on said corresponding input port paired with said first output port.

25. The communication apparatus of claim 22 wherein said scout packet includes a node address of said target node, said apparatus further comprising:
   means for comparing said target node address from said scout packet with said node ID;
   means for delivering said scout packet to an available receive channel upon a condition that said target node address and said node ID match;
   means for sending a path acknowledge packet back to said sender node, retracing said scout's path;
   means for sending a, a path rejection packet is sent back to said source node via said established path if a receive channel is not available; and,
   means for delivering said scout packet to said next node along a minimum-length path to said target node if a receiving node's node ID does not match said target node address.

26. In a network of interconnected nodes;

each node in said network being assigned a unique identification (ID);

a sender node;

said sender node originating an address packet having a target node address of a target node;

each node in said network including comparing means for comparing said target node address with an ID of said node;

said comparing means creating a first condition provided that said ID is not equal to said target node address, indicating that a node is an intermediate node and, alternatively, a second condition provided that said ID is equal to said target node address, indicating that a node is said target node;

a plurality of input ports at each of said nodes;

a plurality of output ports at each of said nodes;

each one of said input ports being paired with a corresponding one of said output ports;

control means at one input port of said input ports of a particular node for receiving said address packet transmitted from an output port of a previous node of said interconnected nodes;

allocating means, operative upon occurrence of said first condition indicating that said particular node is an intermediate node, for allocating to said one input port, one of said output ports of said particular node, but excluding the output port paired with the input port over which said address packet is received;

an improvement characterized by:

means at said particular node for establishing a path to a next node upon occurrence of said first condition at said particular node, resulting in an established path from said sender node through said particular node; and, means for sending a path command packet from said particular node back to said sender node, said path command packet being sent out of a particular node output port paired with a particular node input port over which said address packet was received.

27. The improvement of claim 26 further characterized by:

said path command packet being encoded to return path rejection status to a previous node, indicating that a path is not established at said particular node, or path found status to said sender node, indicating that a path is established to said target node through said particular node.

28. The improvement of claim 26 further characterized by:

means, operative upon occurrence of said second condition indicating that said particular node is a target node, for sending a path command packet from said target node back to said sender node;

said path command packet being sent out of a target node output port paired with a target node input port over which said address packet was received;

said path command packet being encoded to return path found status to said sender node, indicating that a path is established to said target node through said intermediate node;

each intermediate node in an established path sender said command message to a previous node out of an output port paired with an input port over which said message packet was received.

29. The improvement of claim 26 further characterized by:

a port vector;

said allocating means selecting a first unallocated output port from said port vector upon occurrence of said first condition; and, forwarding means for forwarding said address packet to said next node over said first unallocated output port.

30. The improvement of claim 29 further characterized by:

said means for establishing a path to a next node including means for sequentially selecting unallocated output ports from said port vector upon occurrence of said first condition; and, means for encoding said path command packet to return path rejection status to a previous node over an output port paired with said input port on which said address packet was received, upon a condition that selecting unallocated output ports from said port vector results in no path being established to said next node.

31. The improvement of claim 29 further characterized by:

a fold enable vector indicating which of said plurality of output ports can be folded resulting in a folding partner for a chosen output port, said folding partner being an output port through which a message may be routed;

such that if said chosen output port is not available for routing but said folding partner is available, said folding partner is considered as a potential routing candidate.

32. The improvement of claim 28 further characterized by:

sending an end to end acknowledge command packet out of said target node output port paired with said target node input port on which a message packet is received, upon a condition that a message transmission has completed.

33. The improvement of claim 32 further characterized by:

disconnecting an intermediate node output port from an intermediate node input port paired with said intermediate node output port, in response to said end to end acknowledge message.

34. The improvement of claim 26 further characterized by:

a plurality of send channels at said sender node;

each of said send channels having associated with it a send port vector;

said send port vector indicating selected output ports of said sender node through which routing is to be attempted;

a scout packet;

said scout packet being sent out of a first output port of said selected output ports of said sender node, and thereby delivered to an intermediate node, said intermediate node being a next node in a potential path to said target node;

means for locking a path from said send channel to said first of said selected output ports of said sender node, so that said output port is reserved for a pending transmission; and, means for unlocking said path from said send channel to said first output port upon a condition that a path rejection packet is subsequently received on a corresponding input port paired with said first output port.

35. The improvement of claim 34 further characterized by:
inverting said send port vector to provide an alternate send port vector upon a condition that a routing status is route rejected; and,
using said alternate send port vector to select a first unallocated output port from said alternate send port vector to provide said selected output port.

36. The improvement of claim 34 further characterized by:
means for selecting a new output port from said send port vector upon said condition that a path rejection packet is received on said corresponding input port paired with said first output port; and,
means for sending said scout packet out said new output port.

37. The improvement of claim 28 further characterized by:
means for starting a transmission from said sender node to said target node over a path established a send channel at said sender node to a receive channel at said target node, upon a condition that a path acknowledge packet is received at said sender node on said corresponding input port paired with said first output port.

38. In a network of interconnected nodes;
each node in said network being assigned a unique identification (ID);
a sender node originating an address packet having a target node address of a target node;
each node in said network including comparing means for comparing said target node address with a unique identification (ID) of said node;
a method comprising steps of:
A. creating a first condition provided that said ID is not equal to said target node address, indicating that a node is an intermediate node and, alternatively, a second condition provided that said ID is equal to said target node address, indicating that a node is said target node;
B. receiving, at one input port of a particular node, said address packet transmitted from of a previous node of said interconnected nodes;
C. allocating, upon occurrence of said first condition indicating that said particular node is an intermediate node, to said one input port, one of said output ports of said particular node, but excluding an output port paired with an input port over which said address packet is received,
said particular node establishing a path to a next node upon occurrence of said first condition at said particular node, resulting in an established path from said sender node through said particular node; and,
D. sending a path command packet from said particular node back to said sender node out of a particular node output port paired with a particular node input port over which said address packet is received.

39. The method of claim 38 further comprising steps of:
E. encoding said path command packet to return path rejection status to a previous node, indicating that a path is not established at said particular node, or path found status to said sender node, indicating that a path is established to said target node through said particular node.

40. The method of claim 38 further comprising steps of:
E. sending, upon occurrence of said second condition indicating that said particular node is a target node, a path command packet from said target node back to said sender node out of a target node output port paired with a target node input port over which said address packet was received over a target node output port paired with a target node input;
F. encoding said path command packet to return path found status to said sender node, indicating that a path is established to said target node through said intermediate node; and,
G. sending from each intermediate node in an established path said command message to a previous node out of an output port paired with an input port over which said message packet was received.

41. The method of claim 38 further comprising steps of:
E. providing a port vector;
F. selecting a first unallocated output port from said port vector upon occurrence of said first condition; and,
G. forwarding means for forwarding said address packet to said next node over said first unallocated output port.

42. The method of claim 41 further comprising steps of:
H. sequentially selecting unallocated output ports from said port vector upon occurrence of said first condition; and,
I. sending said path command packet encoded to return path rejection status to a previous node over an output port paired with said input port on which said address packet was received, upon a condition that the step of sequentially selecting unallocated output ports from said port vector results in no path being established to said next node.

43. The method of claim 41 further comprising steps of:
H. providing a fold enable vector indicating which of said plurality of output ports can be folded resulting in a folding partner for a chosen output port, said folding partner being an output port through which a message may be routed; and,
I. using said folding partner as potential routing candidate upon a condition that said chosen output port is not available for routing but said folding partner is available.

44. The method of claim 40 further comprising steps of:
H. sending an end to end acknowledge command packet out of said target node output port paired with said target node input port on which a message packet is received, upon a condition that a message transmission has completed.

45. The method of claim 44 further comprising steps of:
I. disconnecting an intermediate node output port from an intermediate node input port paired with said intermediate node output port, in response to said end to end acknowledge message.

46. The method of claim 38 further comprising steps of:
E. providing a plurality of send channels at said sender node;
each of said send channels having associated with it a send port vector;
said send port vector indicating selected output ports of said sender node through which routing is to be attempted;
F. sending a scout packet out of a first output port of said selected output ports of said sender node, and thereby delivered to an intermediate node, said intermediate node being a next node in a potential path to said target node;

G. locking a path from said send channel to said first of said selected output ports of said sender node, so that said output port is reserved for a pending transmission; and, H. unlocking said path from said send channel to said first output port upon a condition that a path rejection packet is subsequently received on a corresponding input port paired with said first output port.

47. The method of claim 46 further comprising steps of:

I. inverting said send port vector to provide an alternate send port vector upon a condition that a routing status is route rejected; and, J. using said alternate send port vector to select a first unallocated output port from said alternate send port vector to provide said selected output port.

48. The method of claim 46 further comprising steps of:

I. selecting a new output port from said send port vector upon said condition that a path rejection packet is received on said corresponding input port paired with said first output port; and, J. sending said scout packet out said new output port.

49. The method of claim 40 further comprising steps of:

H. starting a transmission from said sender node to said target node over a path established a send channel at said sender node to a receive channel at said target node, upon a condition that a path acknowledge packet is received at said sender node on said corresponding input port paired with said first output port.

* * * * *